(12) United States Patent
Srinivasan et al.

(10) Patent No.: US 11,216,202 B1
(45) Date of Patent: Jan. 4, 2022

(54) SYSTEM OF SELECTING AND OPTIMIZING RESOURCES FOR CLOUD BLOCK STORAGE VOLUME

(71) Applicant: Accenture Global Solutions Limited, Dublin (IE)

(72) Inventors: Madhan Kumar Srinivasan, Bengaluru (IN); Guruprasad Pv, Bangalore (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 0 days.

(21) Appl. No.: 16/988,628

(22) Filed: Aug. 8, 2020

(30) Foreign Application Priority Data

Jun. 26, 2020 (IN) .............................. 202041027183

(51) Int. Cl.
*G06F 3/06* (2006.01)
*G06F 7/14* (2006.01)
*H04L 29/08* (2006.01)

(52) U.S. Cl.
CPC .......... *G06F 3/0644* (2013.01); *G06F 3/0604* (2013.01); *G06F 3/064* (2013.01); *G06F 3/067* (2013.01); *G06F 7/14* (2013.01); *H04L 67/1097* (2013.01)

(58) Field of Classification Search
None
See application file for complete search history.

(56) References Cited

U.S. PATENT DOCUMENTS

| 9,740,435 | B2* | 8/2017 | Dolce | G06F 16/183 |
| 9,904,598 | B2* | 2/2018 | Kumarasamy | G06F 11/1451 |
| 2021/0097022 | A1* | 4/2021 | Kumar | G06F 3/065 |

* cited by examiner

*Primary Examiner* — Brian R Peugh
(74) *Attorney, Agent, or Firm* — Crowell & Moring LLP

(57) ABSTRACT

A system includes a multi-layer block storage volume optimization (BSO) stack to generate a BSO token containing prescriptions to optimize block storage volume. The system may receive account information of storage accounts associated with block storage volumes; obtain respective storage regions and respective data redundancy types of the first storage account and the second storage account from the first account information; and generate the BSO token to include instructions to merge the storage accounts according to the respective storage regions and the respective data redundancy types. The system may further obtain historical resource utilization data for the block storage volume; generate historical resource utilization metrics from the historical resource utilization data; determine a resource configuration baseline based on the historical resource utilization metrics; and select a recommended resource configuration from a plurality of resource configurations based on the first resource configuration baseline.

20 Claims, 14 Drawing Sheets

| Unmanaged Standard Storage Volumes | Unmanaged Premium Storage Volumes | Managed Premium Storage Volumes | Amure Unmanaged Standard Storage Accounts | | | |
|---|---|---|---|---|---|---|
| Storage Recommendation Number | Region Code | Redundancy | Total IOPS | Total Storage (GB) | Savings | Storage Accounts |
| 1 | 2 | LRS | 18332 | 41323 | $312 | Storage Account 22<br>Storage Account 5<br>Storage Account 18<br>Storage Account 9 |
| 2 | 1 | ZRS | 19400 | 101230 | $264 | Storage Account 30<br>Storage Account 56<br>Storage Account 61<br>Storage Account 40 |
| 3 | 4 | RA-GRS | 17600 | 223000 | $149 | Storage Account 58<br>Storage Account 29<br>Storage Account 59<br>Storage Account 46 |
| 4 | 1 | GRS | 19650 | 87500 | $79 | Storage Account 51<br>Storage Account 57<br>Storage Account 41<br>Storage Account 53 |

Environment: (All)
Application ID: (All)
Account ID: (All)

ACCEPT   REJECT

FIG. 10

Block Storage Volume Analysis

Storage Volume ID: AZWD32WSWKX33

Statistics-based Config ID recommendation [P70]

| Field | Value |
|---|---|
| Provisioned IOPS | 20000 |
| Maximum IOPS | 15000 |
| 99th Percentile IOPS | 14000 |
| Recommended IOPS | 18000 |
| Provisioned Volume (GB) | 32767 |
| Consumed Volume (GB) | 11960 |
| Recommended Volume (GB) | 16384 |

[ ACCEPT ]  [ REJECT ]

Prediction-based Config ID recommendation [P80]

| Field | Value |
|---|---|
| Provisioned IOPS (Future) | 18000 |
| Forecasted Volume (GB) | 24500 |
| Forecast Accuracy | 93% |
| Accuracy Threshold | 85% |

[ ACCEPT ]  [ REJECT ]

Overall Potential Savings

Potential Savings: $1,638
% of overall savings: 38%

Environment: (All)
Application ID: (All)
Account ID: (All)

Analysis Window (Days): [90] [60] [30]

FIG. 12

SYSTEM OF SELECTING AND OPTIMIZING RESOURCES FOR CLOUD BLOCK STORAGE VOLUME

RELATED APPLICATION

This application claims priority to Indian Provisional Patent Application No. 202041027183, entitled "SYSTEM OF SELECTING AND OPTIMIZING RESOURCES FOR CLOUD BLOCK STORAGE VOLUME" filed on Jun. 26, 2020, wherein the entirety of the above-referenced application is incorporated herein by reference.

TECHNICAL FIELD

This disclosure relates to cloud block storage volumes and, in particular, to resources selection and optimization in cloud computing using a block storage volume optimization system.

BACKGROUND

Rapid advances in communications and storage technologies, driven by immense customer demand, have resulted in widespread adoption of cloud systems for managing large data payloads, distributed computing, and record systems. As one example, modern enterprise systems, for example those relying on block storage architectures, presently maintain data records many petabytes in size in the cloud. Improvements in tools for cloud resource integration and cloud resource allocation, utilization, and consumption prediction will further enhance the capabilities of cloud computing systems.

SUMMARY

This disclosure relates to a system for optimizing a block storage volume by, for example, merging multiple storage accounts associated with the block storage volume and optimizing the resource configuration provisioned on the block storage volume such as rightsizing storage capacity, operation rate, and/or throughput rate configured for the block storage volume. Numerous block storage volumes may be commissioned by a user, such as business organization, using one or more storage accounts for cloud-based computing architectures to store and process the user's data.

A system for optimizing the block storage volume for the user of the block storage volume may include a network interface circuitry and an optimization circuitry in data communication with the network interface circuitry. The network interface circuitry may receive first account information of a first storage account associated with a first block storage volume and second account information of a second storage account associated with a second block storage volume; and send a block storage volume optimization (BSO) token to a host interface. The host interface may execute the BSO token to merge the first storage account with the second storage account. The optimization circuitry may execute a BSO stack. At a prescriptive engine layer of the BSO stack, the BSO stack is executable to obtain respective volume management types of the first block storage volume and the second block storage volume; obtain respective volume performance types of the first block storage volume and the second block storage volume; obtain respective storage regions and respective data redundancy types of the first storage account and the second storage account from the first account information and the second account information, respectively, the respective storage regions including a geographic location information of the respective first and second block storage volumes and, the respective data redundancy types including data replication policy information regarding the respective first and second storage accounts. In response to the respective volume management types being an unmanaged type and the respective volume performance types being a standard type, generate, by the optimization circuitry execution of the BSO stack, the BSO token to include instructions executable by the host interface to merge the first storage account with the second storage account according to the respective storage regions and the respective data redundancy types; and send the BSO token to the host interface via the network interface circuitry.

The system may also perform, a method for optimizing the block storage volume for a user. The method may include, at network interface circuitry, receiving first account information of a first storage account associated with a first block storage volume and second account information of a second storage account associated with a second block storage volume. The optimization circuitry may be in data communication with the network interface circuitry. The method may execute a block storage volume optimization (BSO) stack at the optimization circuitry, including, at a prescriptive engine layer of the BSO stack, obtaining respective volume management types of the first block storage volume and the second block storage volume. The method may also include obtaining respective volume performance types of the first block storage volume and the second block storage volume; and obtaining respective storage regions and respective data redundancy types of the first storage account and the second storage account from the first account information and the second account information, respectively. The respective storage regions may include geographic location information of the respective first and second block storage volumes and the respective data redundancy types may include data replication policy information regarding the respective first and second storage accounts. In response to the respective volume management types being an unmanaged type and the respective volume performance types being a standard type, the method may further include generating a BSO token to include instructions executable by a host interface to merge the first storage account with the second storage account according to the respective storage regions and the respective data redundancy types. The method may further include sending the BSO token, via the network interface circuitry, to a host interface.

A product for optimizing the block storage volume for a user may include machine-readable media other than a transitory signal and instructions stored on the machine-readable media. The instructions may be configured to, when executed, cause a machine to, at network interface circuitry, receive first account information of a first storage account associated with a first block storage volume and second account information of a second storage account associated with a second block storage volume. An optimization circuitry may be in data communication with the network interface circuitry. At the optimization circuitry executing a block storage volume optimization (BSO) stack, the instructions may be configured to, when executed, cause a machine to, at a prescriptive engine layer of the BSO stack, obtain respective volume management types of the first block storage volume and the second block storage volume; obtain respective volume performance types of the first block storage volume and the second block storage volume;

obtain respective storage regions and respective data redundancy types of the first storage account and the second storage account from the first account information and the second account information, respectively. The respective storage regions may include geographic location information of the respective first and second block storage volumes and the respective data redundancy types comprising data replication policy information regarding the respective first and second storage accounts. In response to the respective volume management types being an unmanaged type and the respective volume performance types being a standard type, the instructions may be configured to cause a machine to generate a BSO token to include instructions executable by a host interface to merge the first storage account with the second storage account according to the respective storage regions and the respective data redundancy types. The instructions may be configured to cause a machine to send the BSO token, via the network interface circuitry, to the host interface.

One example of a technical advancement achieved by the system described herein may be that storage accounts may be merged to help reduce the overhead related to data replication and transfer for the storage accounts over different storage regions. For example, the storage accounts may need to maintain their data copies in a storage region different than the storage region to which the storage accounts belong, thereby incurring data replication and transfer between the two storage regions. As a result, each of the storage accounts may be burdened with the cost of such data replication and transfer. Thanks to merging two or more storage accounts into one storage account, the cost of data replication and transfer for the storage accounts may be saved.

Alternatively or additionally, another example of a technical advancement achieved by the system described herein may be that a block storage volume may be re-provisioned with a recommended resource configuration, which then satisfy the storage and processing demands placed on the block storage volume, thereby assuring more efficient storage allocation, faster data retrieval rates, lower latency and more efficient use of CPU resources controlling the data input/output (I/O). The recommended resource configuration may be selected based on multiple historical resource utilization metrics including the metrics of IOPS, throughput, and storage capacity, as well as constraints on IOPS and storage capacity along with pricing information. The recommended resource configuration may include, for example, recommended configurations for IOPS, throughput rate, and storage capacity. In some examples, the selection of the recommended resource configuration may take into account both the statistics-based evaluation and the prediction-based evaluation on the resource configuration. Additional benefits, efficiencies, and improvements over existing market solutions are made evident as described herein.

The system is further described in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

FIG. 10 shows an example block storage volume optimization control interface.

FIG. 12 shows an example block storage volume optimization control interface.

DETAILED DESCRIPTION

A block storage volume may provide a cloud-based data storage and processing services. For example, block storage volumes provisioned under Microsoft Azure cloud storage and computing services may include various types of storage objects such as blobs, files, queues, tables and disks. In some implementations, a block storage volume may be used with a virtual machine. For example, the block storage volume may be mounted to the virtual machine in a predetermined file format, such as a virtual hard disk (VHD) file.

Figure 1:
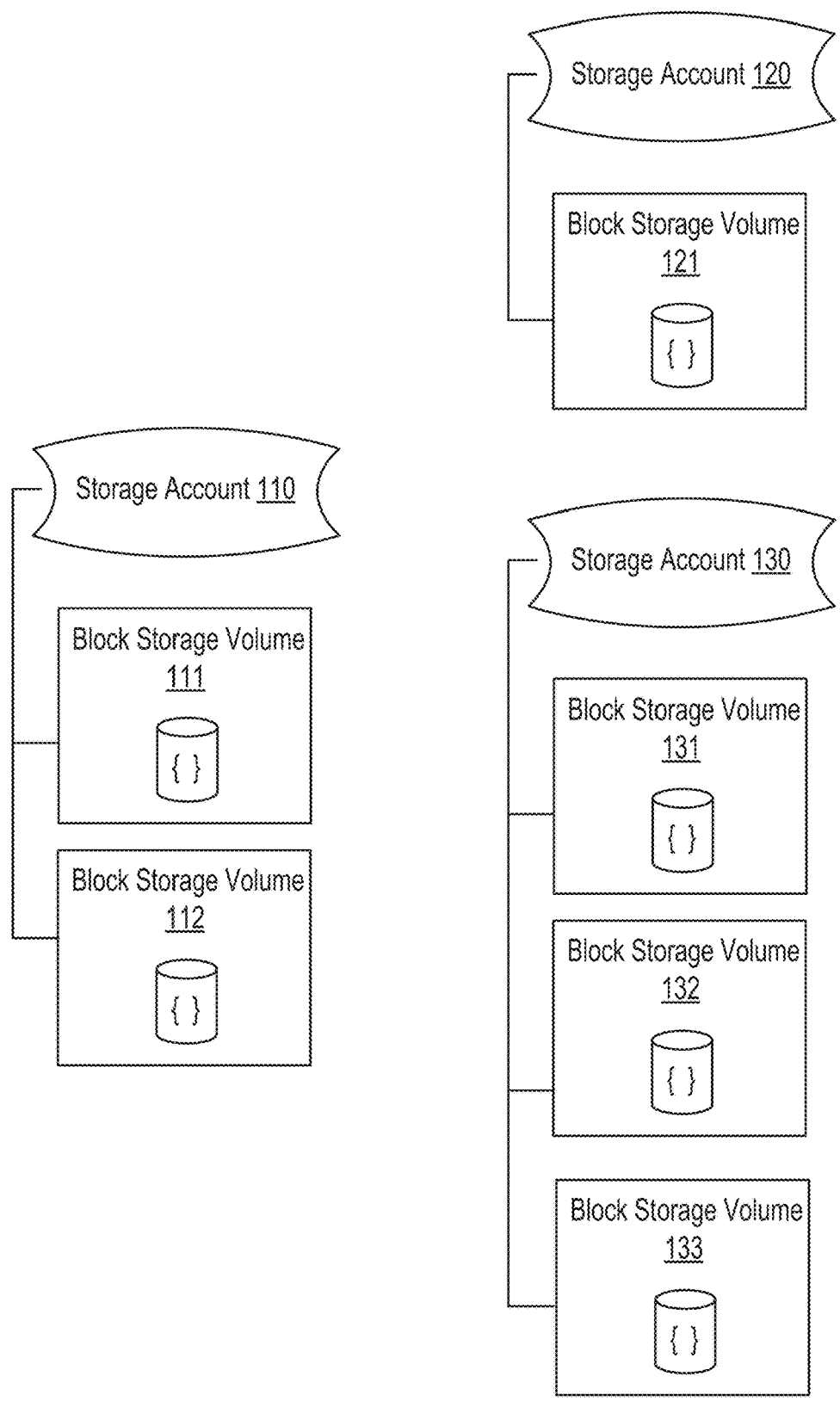
FIG. 1 shows example storage accounts and block storage volume accommodated by the storage accounts.

The block storage volume may be accessed through a storage account. The storage account may, for example, provide a unique namespace for the block storage volume such that it can be accessible from anywhere in the world over Hypertext Transfer Protocol (HTTP) or Hypertext Transfer Protocol Secure (HTTPS). A storage account may accommodate one or more block storage volumes. For example, as shown in FIG. 1, the first storage account 110 may accommodate two block storage volumes 111/112. The second storage account 120 may accommodate one block storage volume 121. The third storage account 130 may accommodate three block storage volumes 131/132/133. In other examples, additional or fewer storage accounts and/or block storage volumes may be present.

In some examples, the block storage volumes may be categorized by predetermined volume management types. The volume management types may include, for example, an unmanaged type and a managed type. A managed type block storage volume may be scaled without limitation, while an unmanaged type block storage volume may have limited scalability. For example, the unmanaged block storage volume may have a storage capacity limit of 500 Terabytes (TB) per storage account. In other words, a sum of storage capacities of unmanaged block storage volumes under the same storage account may not exceed the storage capacity, such as 500 TB. For another example, the unmanaged block storage volume may have an operation rate, such as input/output (I/O) operations per second (IOPS), limit of 20,000 lops per storage account. That is, a sum of an operation rate of unmanaged block storage volumes under the same storage account may not exceed 20,000 IOPS.

Alternatively or additionally, as to the unmanaged block storage volume, a user may need to create a storage account to accommodate the unmanaged block storage volume before accessing the unmanaged block storage volume. As to the managed block storage volume, the cloud storage service platform such as Microsoft Azure may automatically create a storage account for the user to access the managed block storage volume.

In some examples, the block storage volumes may be categorized by volume performance types. The volume performance types may include, for example, premium type and standard type. A premium block storage volume may be designed to support input/output-intensive workloads with significant high throughput and low latency. The processing capacity of a premium block storage volume may be able to reach a predetermined processing capacity threshold. For example, the operation rate of a premium block storage volume may be up to 7,500 IOPS. A standard block storage volume may be suitable to undertake infrequently accessed workloads that are less sensitive to performance variability. The processing capacity of a standard block storage volume may not necessarily reach the predetermined processing capacity threshold.

In some examples, the block storage volumes may be further categorized by volume media types. The volume media types may include, for example, a first media (or a high-end media) such as solid-state drive (SSD)-based storage media and a second media (or a low-end media) such as hard disk drive (HDD)-based storage media. The first media may provide a higher read and write speed than the second media. In an implementation, a premium block storage volume may only use the high-end media while a standard block storage volume may use either the high-end media or the low-end media.

As a result, the block storage volumes may be categorized by the combination of the volume management types, the volume performance types, and/or the volume media types. For example, managed block storage volumes may include a managed premium SSD storage volume, a managed standard SSD storage volume, and a managed standard HDD storage volume. Similarly, unmanaged block storage volumes may include an unmanaged premium SSD storage volume, an unmanaged standard SSD storage volume, and an unmanaged standard HDD storage volume.

A resource configuration for a block storage volume may include, for example, an identifier of the resource configuration, an identifier of a storage account accommodating the block storage volume, a storage capacity, an operation rate, a throughput rate, and/or a consumption metric. In some implementations, the resource configuration may further include, for example, the volume management type, the volume performance type, and/or the volume media type for the block storage volume.

The system disclosed herein may optimize these types of block storage volumes in different ways. In an implementation, the storage accounts accommodating unmanaged standard block storage volumes may be merged to reduce the overhead of data replication and transfer between storage accounts over different storage regions. The storage regions may include geographic location information of the block storage volumes. In another implementation, the resource configuration of managed block storage volume and unmanaged premium block storage may be optimized, for example, by rightsizing the storage capacity, the operation rate, and/or the throughput rate, thereby assuring more efficient storage allocation, faster data retrieval rates, lower latency and more efficient use of CPU resources controlling the data I/O.

Figure 2:
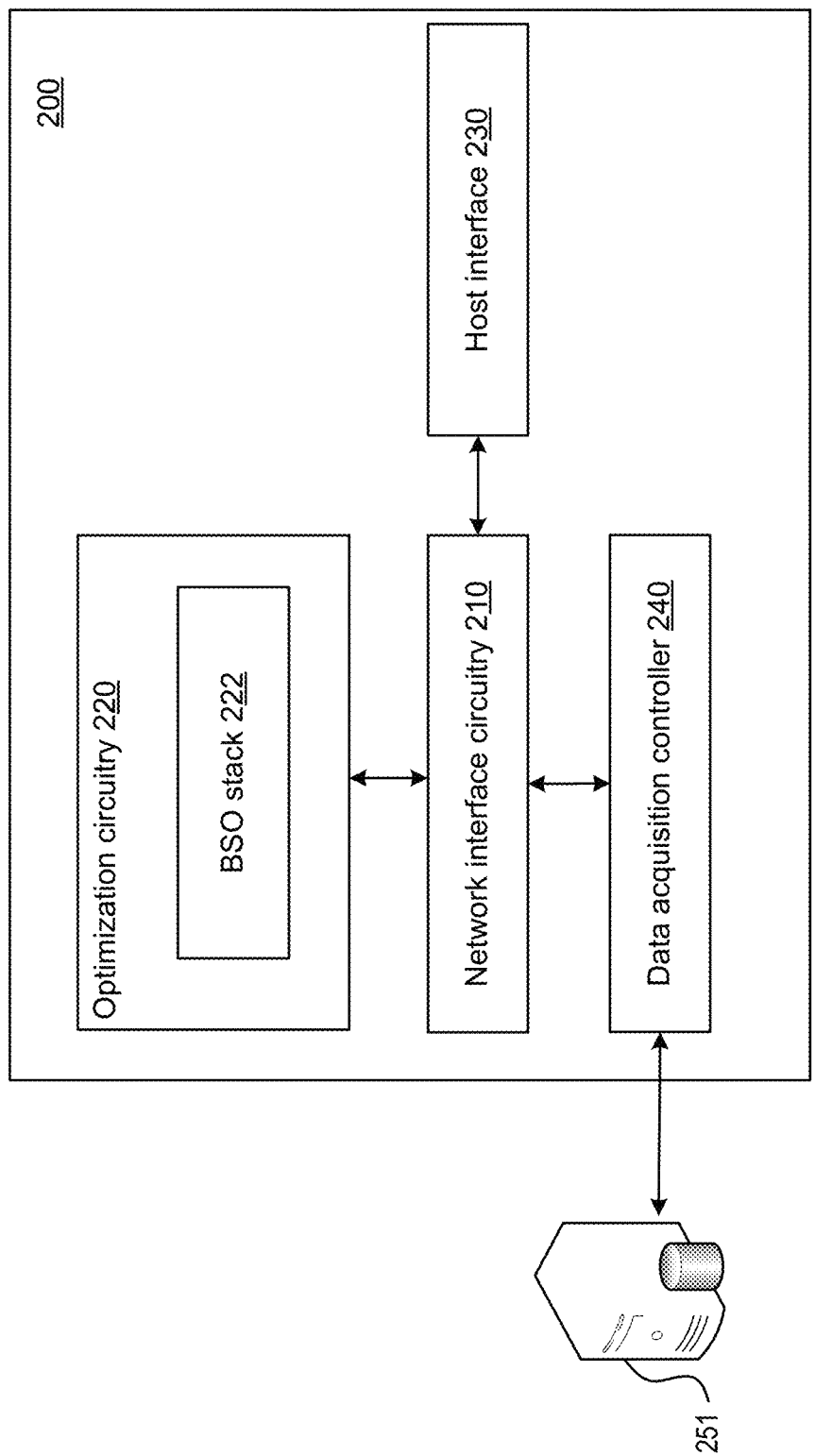
FIG. 2 shows an example system for optimizing the block storage volume in accordance with an embodiment.

FIG. 2 illustrates an example block storage volume optimization system 200 for optimizing a block storage volume. The system 200 may include a network interface circuitry 210, an optimization circuitry 220, a host interface 230, and a data acquisition controller 240. The network interface circuitry 210 may communicate with the optimization circuitry 220, the host interface 230, and the data acquisition controller 240.

The data acquisition controller 240 may obtain account information of individual storage accounts from data sources 251, which may include storage account configuration files. The account information may include, for example, a storage region and a data redundancy type of a block storage account. The storage regions may include geographic location information of the block storage volume. In an example, the geographic location information may include one or more availability zones. An availability zone may indicate a unique physical location within the storage region.

The data redundancy type may include data replication policy information regarding the block storage volume. For example, the data redundancy type may indicate that two or more synchronous data copies are maintained within a same availability zone, which may be referred to as locally redundancy storage (LRS). Alternatively or additionally, the data redundancy type may indicate that two or more synchronous data copies are respectively maintained in three availability zones within a same storage region, which may be referred to as zone redundancy storage (ZRS). Alternatively or additionally, the data redundancy type may indicate that two or more synchronous data copies are maintained within a same availability zone from a storage region and one additional asynchronous data copy is maintained within another availability zone from a different storage region, which may be referred to as Geo-redundancy storage (GRS).

In some examples, the data acquisition controller 240 may further obtain historical resource utilization data related to the block storage volumes accommodated by the storage accounts from the data sources 251. The data sources 251 may further include block storage volume utilization files, block storage volume expenditure files, or other data sources. The historical resource utilization data may implicate historical resource utilization metrics that are indicative of resource utilization for the block storage volumes. In some implementations, the historical resource utilization metrics may include metrics of a runtime operation rate, such as IOPS, at a particular time or over a time range. Alternatively or additionally, the historical resource utilization metrics may include metrics of a runtime throughput rate, such as MB/S, at a particular time or over a time range. Alternatively or additionally, the historical resource utilization metrics may include metrics of a consumed storage capacity at a particular time or over a time range.

The network interface circuitry 210 may communicate with the data acquisition controller 240 to receive account information of storage accounts 110/120/130 and/or historical resource utilization data of the block storage volumes 111/112/121/131/132/133. The optimization circuitry 220 may execute the block storage volume optimization (BSO) stack 222 to perform prescriptive analysis on the account information and the historical resource utilization data to obtain optimization recommendations for the block storage volumes. The functions of the BSO stack 222 will be described in detail later with reference to FIG. 3. During execution of the BSO stack 222, the optimization circuitry 220 may generate a BSO token that may, for example, include instructions to perform a recommended optimization action such as merging storage accounts and/or re-provisioning block storage volumes with corresponding recommended resource configurations. The network interface circuitry 210 may send the BSO token to the host interface 230. The host interface 230 may, for example, include an Application Programming Interface (API) for executing the instructions in the BSO token to perform the recommended optimization action.

Figure 3:
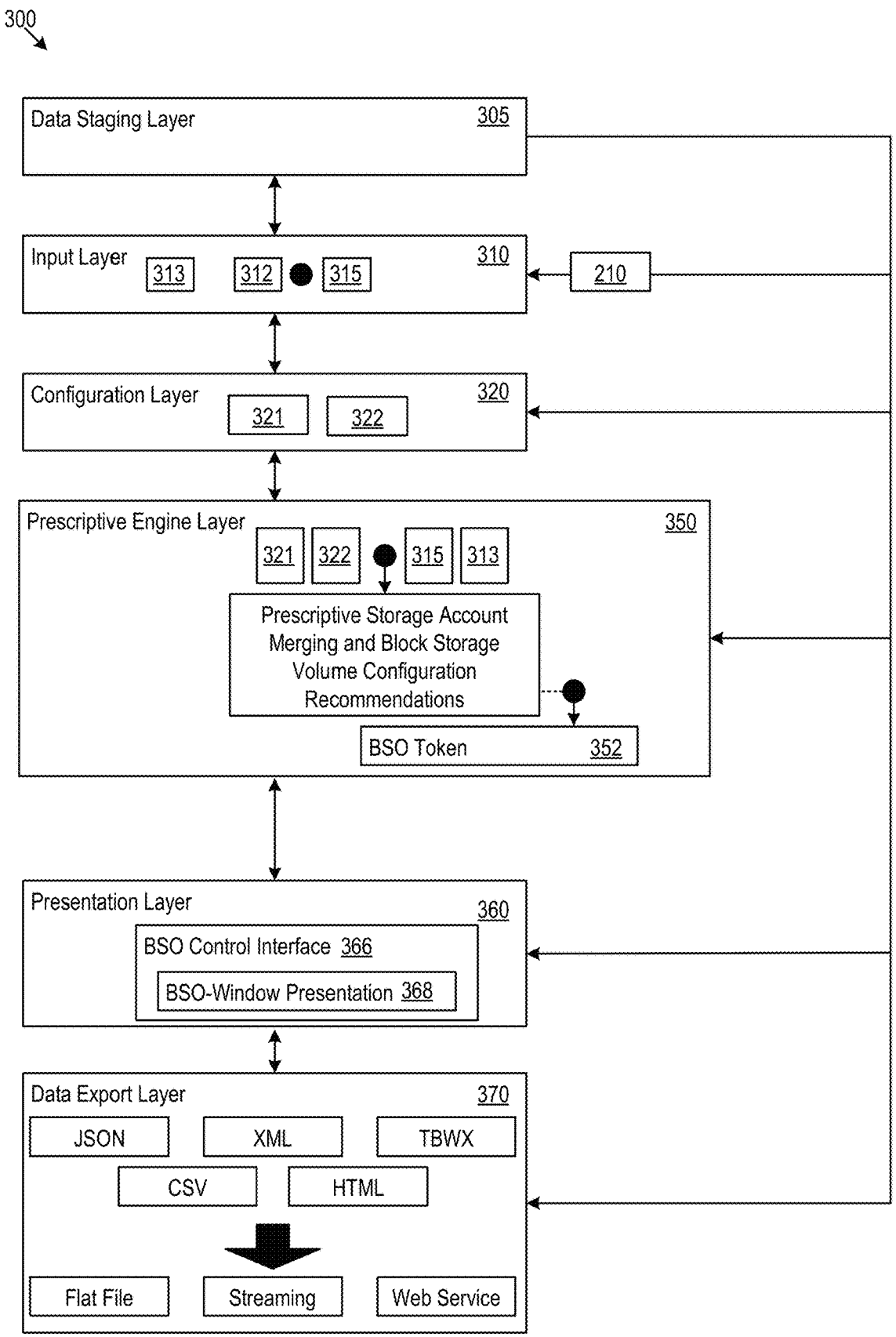
FIG. 3 shows an example multiple-layer block storage volume optimization stack included in a system in accordance with an embodiment.

FIG. 3 shows an example multiple layer BSO stack 300. The block storage volume optimization system described herein may use the BSO stack 300 to prescribe recommendations for a block storage volume based on analysis of data associated with the block storage volume. The block storage volume optimization analysis performed by the system may include, for example, merging storage accounts and re-provisioning block storage volumes with corresponding recommended resource configuration.

In this example, the BSO stack 300 may include a data staging layer 305, an input layer 310, a configuration layer 320, a prescriptive engine layer 350, a presentation layer 360, and a data export layer 370. The BSO stack 300 may include a multiple-layer computing structure of hardware and software that may provide prescriptive analytical recommendations (e.g., storage account merging and block storage volume optimization prescriptions) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example, for the BSO stack 300, the data staging layer 305 may provide the input layer 310 with storage resources to store ingested data within a database or other data structure. In some implementations, the data staging layer 305 may be deployed as a cloud-based database platform with the capability to process mass data. In an example, an underlying Big Data Lake of the database platform is capable of ingesting data from heterogeneous data sources such as Secured Storage, Hadoop file systems (HDFS) connections, relational databases, flat files, and other data operations. Hence, the data staging layer 305 may provide a hardware resource, e.g., memory resources, to the input layer 310. Accordingly, the multiple-layer stack architecture of the BSO stack 300 may improve the functioning of the underlying hardware.

Figure 4:
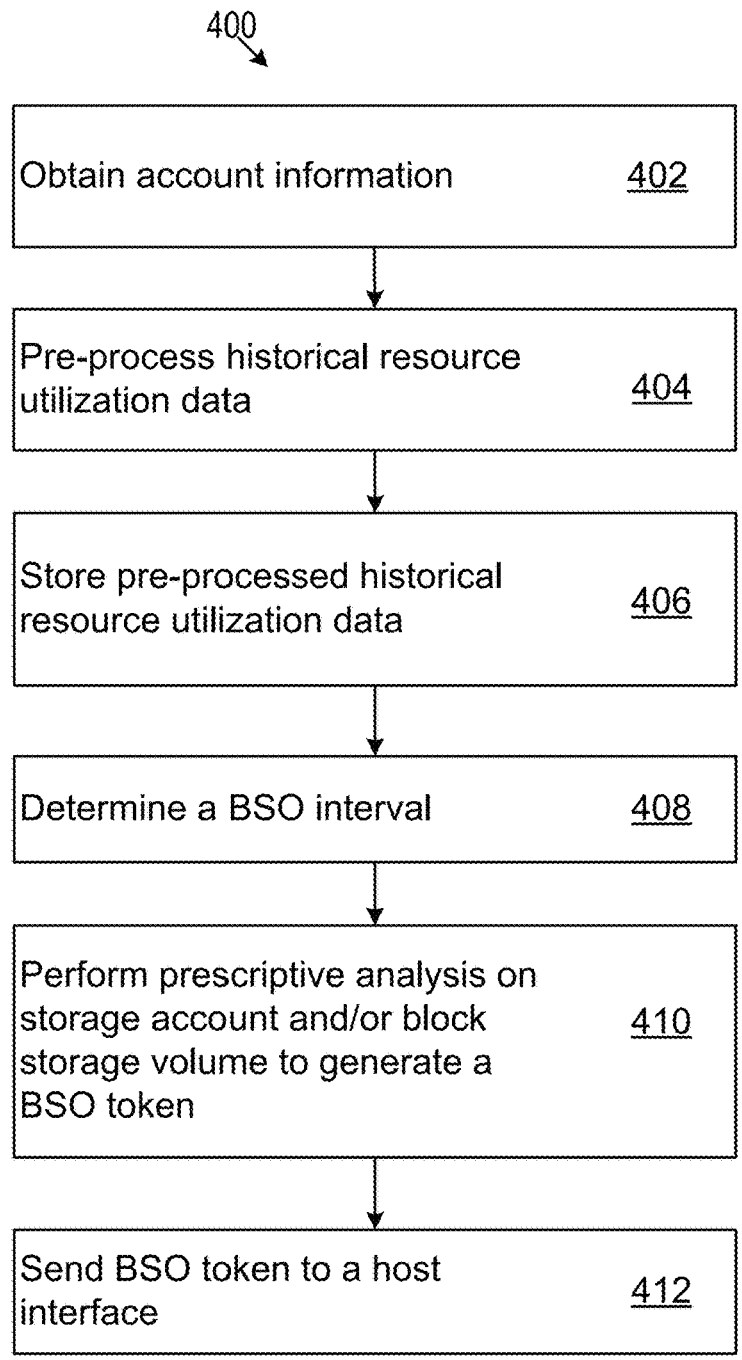
FIG. 4 shows example block storage volume optimization logic in accordance with an embodiment.

In the following, reference is made to FIG. 3 and an example BSO logic (BSOL) 400 in FIG. 4. It will be appreciated that the logical features of the example BSOL may be implemented in various orders and combinations. For example, in a first implementation, one or more features may be omitted or reordered with respect to a second implementation. At the input layer 310 of the BSO stack 300, the BSOL 400 may obtain account information 313 of storage accounts and historical resource utilization data 312 of block storage volumes under the storage accounts as the input data (402). The account information 313 and the historical resource utilization data 312 may be received, for example, via the network interface circuitry 210.

Optionally, at the input layer 310, the BSOL 400 may pre-process the historical resource utilization data 312 (404). In some implementations, the pre-processing may include data transformations on the historical resource utilization data 312 such as z transformation, log transformation and data minimization. Alternatively or additionally, the pre-processing may treat missing value data in the historical resource utilization data 312. For example, the missing value data is treated to map NULL to 0.

The BSOL 400 then may, at the input layer 310, store the pre-processed historical resource utilization data 315 via a memory operation at the data staging layer 305 (406). In some implementations, the pre-processed historical resource utilization data 315 may be indexed to speed up query processing.

At the configuration layer 320, the BSOL 400 may determine a BSO interval 321 to optimize the block storage volumes (408). For example, the BSO interval 321 may be predetermined to be periodical or non-periodical (e.g., hourly, six hours, daily, weekly, month-date, and yearly). Alternatively or in addition, the BSO interval 321 may be selected by the system operator. The BSOL 400 may further determine the utilization thresholds 322 to be used in the prescriptive optimization analysis such as operation rate threshold, throughput rate threshold, and storage capacity threshold.

At the prescriptive engine layer 350, the BSOL 400 may perform prescriptive analysis on the storage accounts and the block storage volumes to generate a BSO token to apply storage account merging and/or resource configuration optimization recommendations (410). Then, the BSOL 400 may send the BSO token to, for example, the host interface 230 via the network interface circuitry 210 (412).

Figure 5:
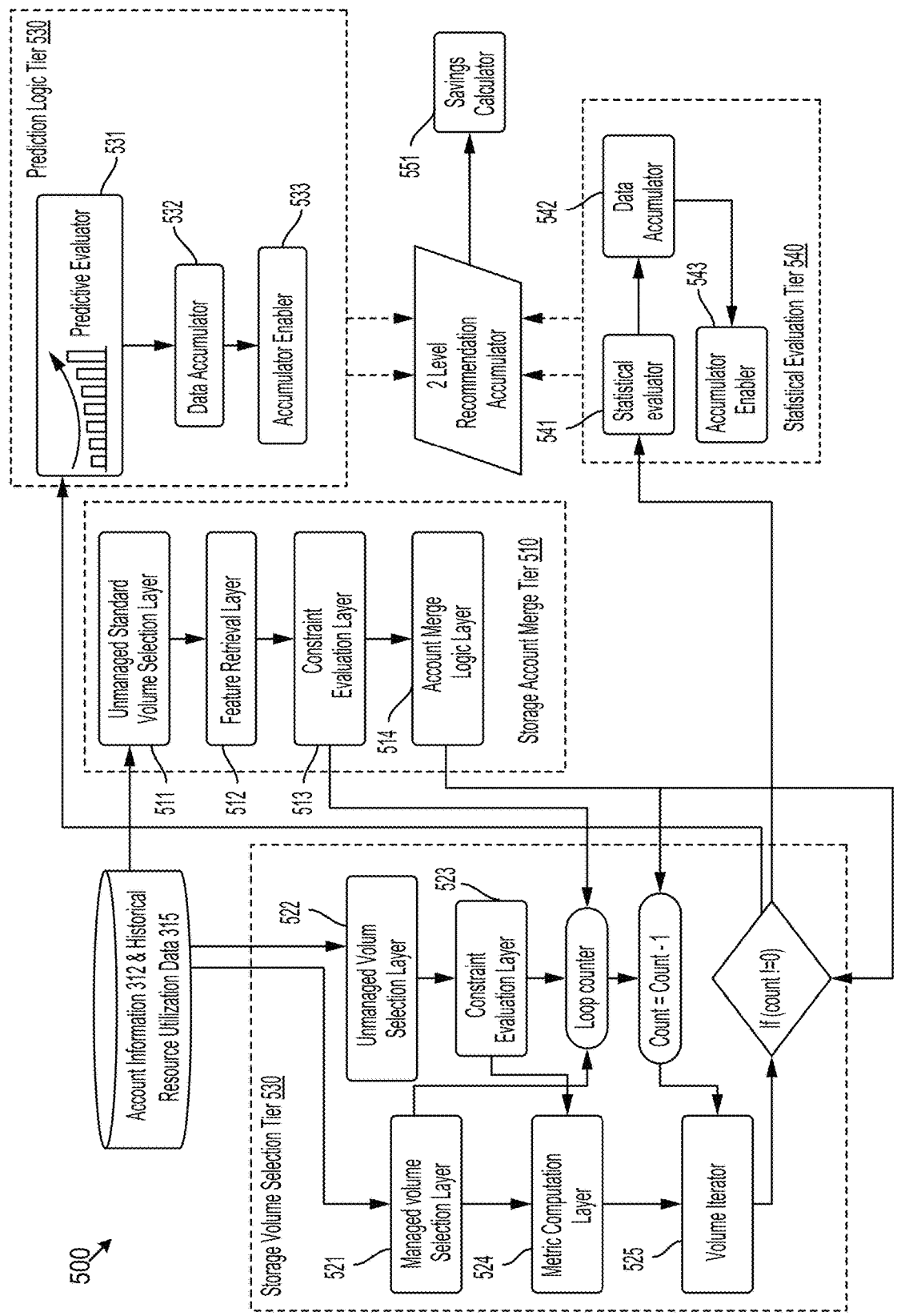
FIG. 5 shows an example system execution implementation for a prescriptive engine layer of the block storage volume optimization stack in accordance with an embodiment.

FIG. 5 is a block diagram example of a block storage volume optimization system 500 illustrating execution implementation for the prescriptive engine layer 350 of the BSO stack 300. Example operation 410 of the BSOL 400 at the prescriptive engine layer 350 will be described with reference to the system 500 of FIG. 5.

Figure 6:
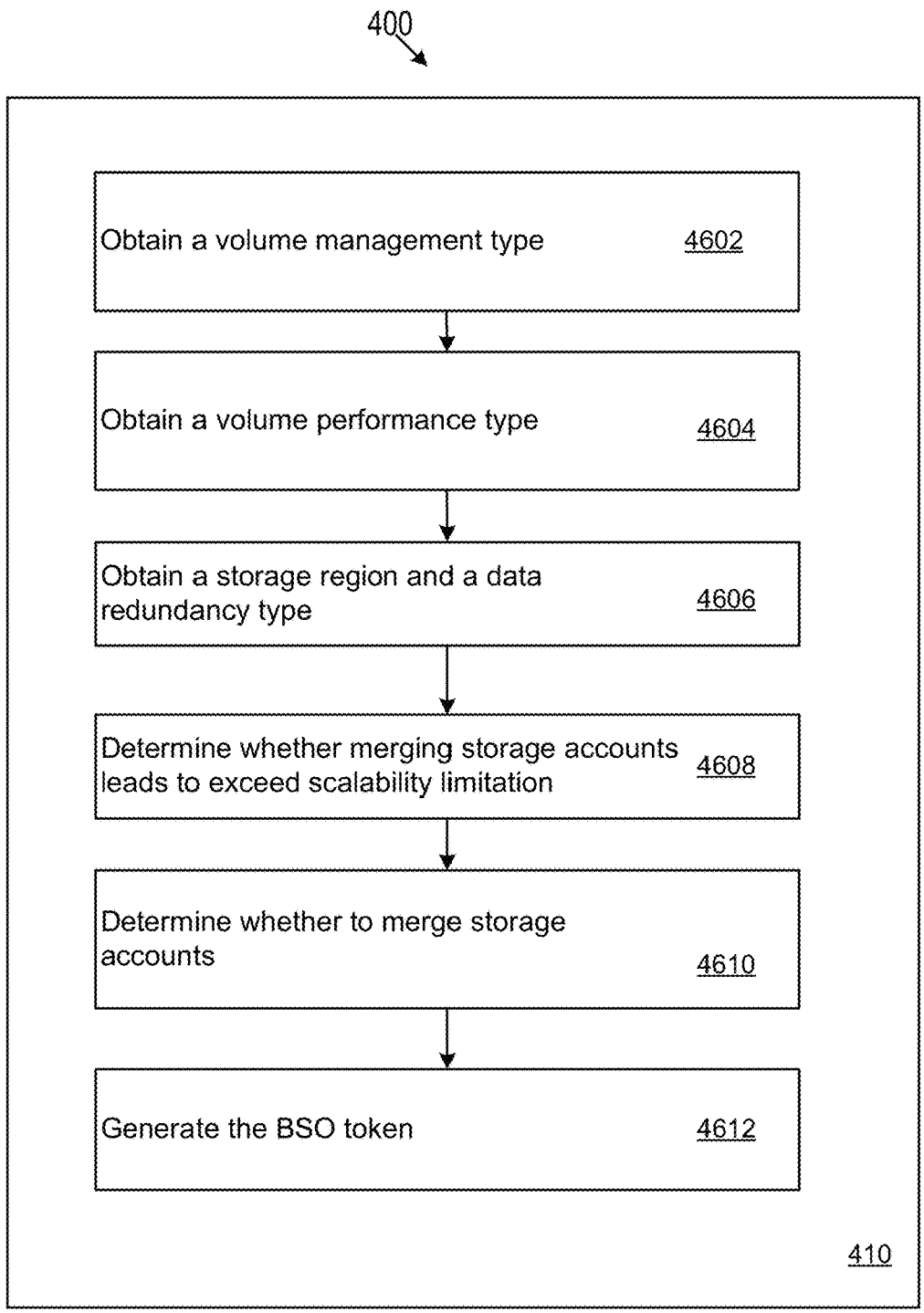
FIG. 6 shows example block storage volume optimization logic in accordance with an embodiment.

The execution of the system 500 may include a storage account merge tier 510. The storage account merge tier 510 may include an unmanaged standard volume selection layer 511, a feature retrieval layer 512, a constraint layer 513, and an account merge logic layer 514. The storage account merge tier 510 may function to analyze storage accounts to generate storage account merging recommendations, which will be described with reference to FIG. 6.

At the unmanaged standard volume selection layer 511, the BSOL 400 may obtain a first volume management type of the first block storage volume 111 under the first block storage account 110 and a second volume management type of the second block storage volume 121 under the second block storage account 120 (4602). In an implementation, the BSOL 400 may obtain a first provisioned resource configuration of the first block storage volume 110, for example, via the data staging layer 305. Then, the BSOL may derive the first volume management type from the first provisioned resource configuration. Similarly, the BSOL 400 may obtain a second provisioned resource configuration of the second block storage volume 120 and derive the second management type from the second provisioned resource configuration.

At the unmanaged standard volume selection layer 511, the BSOL 400 may further obtain a first volume performance type of the first block storage volume 111 under the first block storage account 110 and a second volume performance type of the second block storage volume 121 under the second block storage account 120 (4604). Similar to the operation at 4602, the BSOL 400 may derive the first volume performance type from the first provisioned resource configuration and derive the second performance type from the second provisioned resource configuration.

Where both the first volume management type and the second volume management type are unmanaged type, and both the first volume performance type and the second volume performance type are standard type, at the feature retrieval layer 512, the BSOL 400 may obtain a first storage region and a first data redundancy type of the first storage account 110 from the first account information of the first storage account 110 and a second storage region and a second data redundancy type of the second storage account 120 from the second account information of the second storage account 110 (4606).

At the constraint evaluation layer 523, the BSOL 400 may determine whether merging the first storage account 110 with the second storage account 120 may lead to exceed the scalability limitation placed on an unmanaged storage account (4608). In an implementation, the BSOL 400 may calculate a total storage capacity for the first storage account 110 and the second storage account 120 by summing the storage capacities of the first block storage volume 111, the block storage volume 112, and the second block storage volume 121. If the total storage capacity is greater than a predetermined storage capacity threshold, e.g., 500 TB, the BSOL 400 may determine that the first storage account 110 cannot be merged with the second storage account 120. Otherwise, the BSOL 400 may proceed to subsequent operations.

Alternatively or additionally, the BSOL 400 may calculate a total operation rate for the first storage account 110 and the second storage account 120 by summing the maximum operation rates of the first block storage volume 111, the block storage volume 112, and the second block storage volume 121. If the total operation rate is greater than a predetermined operation rate threshold, e.g., 20,000 IOPS, the BSOL 400 may determine that the first storage account 110 cannot be merged with the second storage account 120. Otherwise, the BSOL 400 may proceed to subsequent operations.

At the account merge logic layer 514, the BSOL 400 may determine whether to merge the first storage account 110 with the second storage account 120 according to the first storage region and the first data redundancy type of the first storage account 110 as well as the second storage region and the second data redundancy type of the second storage account 120 (4610). In an implementation, the BSOL 400 may compare the first storage region with the second storage region and compare the first data redundancy type with the second data redundancy type. If the first storage region and the second storage region are located at the same region and the first data redundancy type and the second data redundancy type belong to the same data redundancy type, the BSOL 400 may determine to merge the first storage account 110 with the second storage account 120. Subsequently, the BSOL 400 may generate the BSO token to include instructions executable, for example, by the host interface 230 to merge the first storage account 110 with the second storage account 120 (4612).

Optionally, subject to scalability constraint placed on the storage account, the BSOL 400 may merge multiple storage accounts into a storage account. In this case, the BSOL 400 may need to determine the order of merging the multiple storage accounts. In an implementation, the BSOL 400 may obtain respective merging priorities of the storage accounts based on the respective summing operation rates for the storage accounts and determine the order based on merging priorities of the storage accounts. For example, both the second storage account 120 and the third storage account 130 is to be merged into the first storage account 110. The BSOL 400 may obtain the summing operation rate for the second storage account 120 by summing the maximum operation rates of the block storage volumes 121/122 and obtain the summing operation rate for the third storage account 130 by summing the maximum operation rates of the block storage volumes 131/131/133. Where the summing operation rate for the second storage account 120 is greater than the summing operation rate for the third storage account 130, the BSOL 400 may determine that the second storage account 120 has a higher merging priority than the third storage account 130. Alternatively or additionally, the BSOL 400 may obtain respective merging priorities of the storage accounts based on the respective summing storage capacity for the storage accounts and determine the order based on merging priorities of the storage accounts.

Merging storage accounts may help reduce the cost related to data replication and transfer over different storage regions. For example, both the first storage account 110 and the second storage account 120 belong to the storage region A and have a data redundancy type of GRS. That said, the first storage account 110 and the second storage account may need to maintain their data copies in a storage region different from the storage region A which incurs data replication and transfer between the two storage regions. As a result, the first storage account 110 and the second storage account 120 may be burdened with the cost of such data replication and transfer respectively. Thanks to merging the second storage account 120 into the first storage account 110, the cost of the data replication and transfer for the second storage account 120 is saved.

The execution of the system 500 may further include a storage volume selection tier 520, a prediction logic tier 530, and a statistical evaluation tier 540. The storage volume selection tier 520 may include a managed volume selection layer 521, an unmanaged volume selection layer 522, a constraint evaluation layer 523, a metric computation layer 524, and a volume iterator 525. The prediction logic tier 530 may include a predictive evaluator 531, the data accumulator 532, and the accumulator enabler 533. The statistical evaluation tier 540 may include a statistical evaluation 541, a data accumulator 542, and an accumulator enabler 543. The tiers 520/530/540 may collaboratively function to generate resource configuration recommendations for managed block storage volumes, which will be described with reference to FIG. 7. In an implementation, two resource configuration recommendations may be generated for a managed block storage volume, a statistics-based resource configuration recommendation and a prediction-based resource configuration recommendation. The statistics-based resource configuration recommendation may be generated at the statistical evaluation tier 540 while the prediction-based resource configuration recommendation may be generated at the prediction logic tier 530.

At the managed volume selection layer 521, the BSOL 400 may select block storage volumes with managed type. In an example, the BSOL 400 may obtain a provisioned resource configuration of the first block storage volume 111 via the data staging layer 305 (4702). Then, the BSOL 400 may derive the volume management type from the provisioned resource configuration (4704). If the first volume manage type is managed type, the first block storage volume 111 is selected.

At the metric computation layer 524, the BSOL 400 may retrieve historical resource utilization data of the first block storage volume 111 from the pre-processed historical resource utilization data 315 (4706). Then, the BSOL 400 may generate historical resource utilization metrics of the first block storage volume 111 from the historical resource utilization data for the first block storage volume 111 (4708).

In an implementation, the historical resource utilization metrics may include a maximum operation rate and a percentile-based operation rate (e.g., 99th percentile) of the first block storage volume 111 over a predetermined time range, e.g., the past 90 days. Alternatively or additionally, the historical resource utilization metrics may include a maximum throughput rate and a percentile-based throughput rate (e.g., 99th percentile) of the first block storage volume 111 over the predetermined time range. Alternatively or additionally, the historical resource utilization metrics may include information of storage capacity that have been consumed.

Upon obtaining historical resource utilization metrics for individual block storage volumes, the BSOL 400 may sequentially proceed to perform the prescriptive analysis on the block storage volumes at the prediction logic tier 530 and the statistical evaluation tier 540 through the volume iterator 525. At the statistical evaluator 541 of the statistical evaluation tier 540, the BSOL 400 may determine a first resource configuration baseline based on the historical resource utilization metrics and the provisioned resource configuration of the first block storage volume 111 (4710). In an implementation, the first resource configuration baseline may include a first operation rate. The BSOL 400 may calculate an operation rate ratio of the maximum operation rate to the percentile-based operation rate and determine the first operation rate based on the operation rate ratio and a provisioned operation rate of the first block storage volume 111 derived from the provisioned resource configuration.

For example, in the case that the operation rate ratio is less than or equal to a predetermined operation rate ratio threshold, the BSOL 400 may determine if the maximum operation rate plus a predetermined percentage buffer is less than the provisioned operation rate. If this is the case, the BSOL 400 may determine the first operation rate to be equal to the buffered maximum operation rate. Otherwise, the BSOL 400 may determine the first operation rate to be equal to the provisioned operation rate. In the case that the operation rate ratio is greater than the predetermined operation rate ratio threshold, the BSOL 400 may determine if the percentile-based operation rate plus a predetermined percentage buffer is less than the provisioned operation rate. If this is the case, the BSOL 400 may determine the first operation rate to be equal to the buffered percentile-based operation rate. Otherwise, the BSOL 400 may determine the first operation rate to be equal to the provisioned operation rate.

Alternatively or additionally, the first resource configuration baseline may include a first throughput rate. The BSOL 400 may calculate a throughput rate ratio of the maximum throughput rate to the percentile-based throughput rate and determine the first throughput rate based on the throughput rate ratio and a provisioned throughput rate of the first block storage volume 111 derived from the provisioned resource configuration.

For example, in the case that the throughput rate ratio is less than or equal to a predetermined throughput rate ratio threshold, the BSOL 400 may determine if the maximum throughput rate plus a predetermined percentage buffer is less than the provisioned throughput rate. If this is the case, the BSOL 400 may determine the first throughput rate to be equal to the buffered maximum operation rate. Otherwise, the BSOL 400 may determine the first throughput rate to be equal to the provisioned throughput rate. In the case that the throughput rate ratio is greater than the predetermined throughput rate ratio threshold, the BSOL 400 may determine if the percentile-based throughput rate plus a predetermined percentage buffer is less than the provisioned throughput rate. If this is the case, the BSOL 400 may determine the first throughput rate to be equal to the buffered percentile-based throughput rate. Otherwise, the BSOL 400 may determine the first throughput rate to be equal to the provisioned throughput rate.

Alternatively or additionally, the first resource configuration baseline may include a first storage capacity. The BSOL 400 may calculate a storage capacity utilization ratio of the provisioned storage capacity of the first block storage volume 111 to the consumed storage capacity obtained from the historical resource utilization metrics. Then, the BSOL 400 may determine the first storage capacity based on the storage capacity utilization ratio. For example, if the storage capacity utilization ratio is greater than or equal to a predetermined storage capacity utilization ratio threshold, e.g., 1.5, the BSOL 400 may determine the first storage capacity to be equal to the consumed storage capacity plus a predetermined percentage buffer. Otherwise, the BSOL 400 may determine the first storage capacity to be equal to the provisioned storage capacity.

Continuing at the statistical evaluator 541, the BSOL 400 may select a statistics-based resource configuration recommendation for the first block storage volume 111 from a plurality of resource configurations based on the first resource configuration baseline (4712). In an implementation, the BSOL 400 may select candidate resource configurations exceeding the first resource configuration baseline from a plurality of resource configurations and determine one of the candidate resource configurations as the statistics-based resource configuration recommendation based on consumption metrics associated with the candidate resource configurations.

The plurality of resource configurations may be predetermined in the cloud-based storage service platform such as Microsoft Azure. For example, the exemplary predetermined resource configurations are listed in Table 1. As shown, the predetermined resource configurations are configured for block storage volumes with different volume media types and volume performance types. Each of the predetermined resource configurations may include a storage capacity, an operation rate, a throughput rate and an corresponding consumption metric for a block storage volume when the block storage volume is provisioned with the resource configuration.

TABLE 1

Predetermined Resource Configurations

| Identifier | Storage capacity (GB) | operation rate (IOPS) | Throughput rate (MB/s) | Media type | Performance type | Consumption metric |
|---|---|---|---|---|---|---|
| P4 | 32 | 120 | 25 | SSD | Premium | $4.81 |
| P6 | 64 | 240 | 50 | SSD | Premium | $9.29 |
| P10 | 128 | 500 | 100 | SSD | Premium | $17.92 |
| P15 | 256 | 1,100 | 125 | SSD | Premium | $34.56 |
| P20 | 512 | 2,300 | 150 | SSD | Premium | $66.56 |
| P30 | 1024 | 5,000 | 200 | SSD | Premium | $122.88 |
| P40 | 2048 | 7,500 | 250 | SSD | Premium | $235.52 |
| E4 | 32 | 120 | 25 | SSD | Standard | $2.40 |
| E6 | 64 | 240 | 50 | SSD | Standard | $4.80 |

TABLE 1-continued

Predetermined Resource Configurations

| Identifier | Storage capacity (GB) | operation rate (IOPS) | Through-put rate (MB/s) | Media type | Performance type | Consumption metric |
|---|---|---|---|---|---|---|
| E10 | 128 | 500 | 60 | SSD | Standard | $9.60 |
| E15 | 256 | 500 | 60 | SSD | Standard | $19.20 |
| E20 | 512 | 500 | 60 | SSD | Standard | $38.40 |
| E30 | 1024 | 500 | 60 | SSD | Standard | $76.80 |
| E40 | 2048 | 500 | 60 | SSD | Standard | $153.60 |
| S4 | 32 | 500 | 60 | HDD | Standard | $1.54 |
| S6 | 64 | 500 | 60 | HDD | Standard | $3.01 |
| S10 | 128 | 500 | 60 | HDD | Standard | $5.89 |
| S15 | 256 | 500 | 60 | HDD | Standard | $11.33 |
| S20 | 512 | 500 | 60 | HDD | Standard | $21.76 |
| S30 | 1024 | 500 | 60 | HDD | Standard | $40.96 |
| S40 | 2048 | 500 | 60 | HDD | Standard | $77.83 |

As an example, the BSOL 400 may compare the first storage capacity, the first operation rate, and the first throughput rate in the first resource configuration baseline with the storage capacity, the operation rate, and the throughput rate in each predetermined resource configuration in Table 1, respectively. If the storage capacity, the operation rate, and the throughput rate of the predetermined resource configuration are respectively greater than the first storage capacity, the first operation rate, and the first throughput rate, the BSOL 400 may select the predetermined resource configuration as a candidate resource configuration. In this way, one or more candidate resource configuration may be selected. Then, the BSOL 400 may select the candidate resource configuration with the lowest consumption metric as the statistics-based resource configuration recommendation. For example, the predetermined resource configurations P30, P40, E20, E30, E40, S20, S30, and S40 are selected as the candidate resource configurations. As such, the BSOL 400 may select the predetermined resource configuration S20 as the statistics-based resource configuration recommendation of the first block storage volume 111 due to its lowest consumption metric.

Optionally, where the current volume media type as provided in the provisioned resource configuration of the first block storage volume 111 is a high-end media such as SSD, the BSOL 400 may remove the predetermined resource configurations with a low-end media such as HDD from the candidate resource configurations. Continue the previous example, because the volume media type of the first block storage volume 111 is SSD, the predetermined resource configurations S20, S30, and S40 may be removed from the list of candidate resource configurations. Accordingly, the predetermined resource configuration E20 may be selected as statistics-based resource configuration recommendation for the first block storage volume 111.

Optionally, the BSOL 400 may output statistics-based recommended resource configurations for individual block storage volumes to the data accumulator 542. At the accumulator enabler 543, the BSOL 400 may monitor if all of the block storage volumes have been analyzed at the statistical evaluation tier 540.

Figure 8:
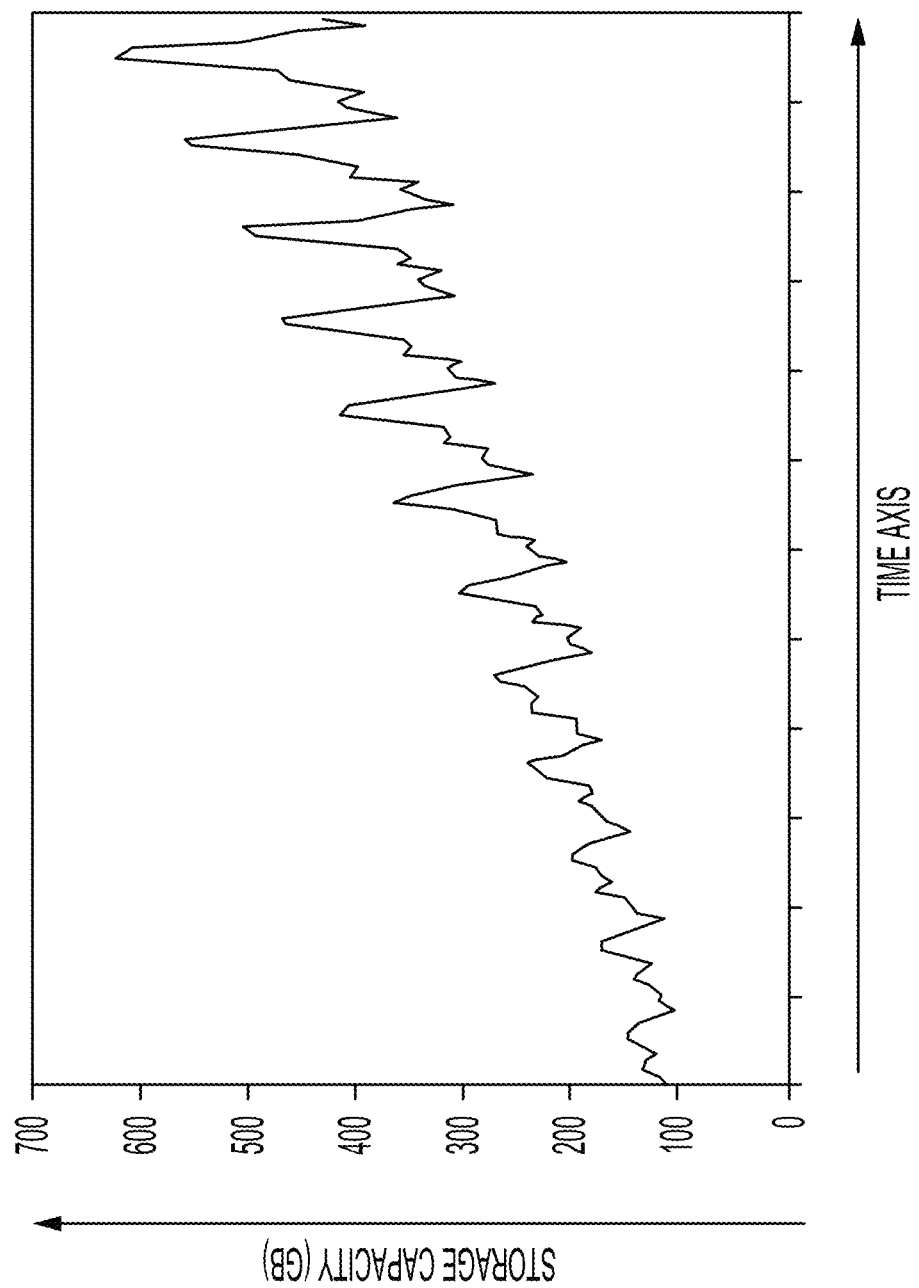
FIG. 8 shows a growth pattern of storage capacity provisioned on the block storage volume over time in accordance with an embodiment.

At the predictive evaluator 531 of the prediction logic tier 530, the BSOL 400 may determine a second resource configuration baseline for the first block storage volume 111 based on the historical resource utilization data of the first block storage volume 111 obtained from the pre-processed historical resource utilization data 315 (4714). In an implementation, the second resource configuration baseline may include a second storage capacity. The BSOL 400 may obtain the historical storage capacity utilization data of the first block storage volume 111 from the pre-processed historical resource utilization data 315, and then predict the second storage capacity based on the historical storage capacity utilization data. In an example, the growth of provisioned storage capacity for the first block storage volume 111 is non-stationary in nature. Instead, the provisioned storage capacity increases with cyclical fluctuation over time as shown in FIG. 8. In this case, the BSOL 400 may use a standard time-series prediction technique such as Autoregressive Integrated Moving Average (ARIMA) to predict the storage capacity to be consumed in the next BSO interval 321 for the first block storage volume 111, because the ARIMA is a suitable model for the prediction with such growth nature.

Then, the BSOL 400 may select a prediction-based resource configuration recommendation from a plurality of resource configurations based on the second resource configuration baseline (4716). In an implementation, similar to the selection of the statistics-based resource configuration recommendation as previously discussed in the context of the statistical evaluator 541, the BSOL 400 may select candidate resource configurations exceeding the second resource configuration baseline from the predetermined resource configurations as listed in Table 1, and determine one of the candidate resource configurations as the prediction-based resource configuration recommendation based on consumption metrics associated with the candidate resource configurations.

Optionally, the BSOL 400 may select the prediction-based resource configuration recommendation from the plurality of resource configurations based on both the second resource configuration baseline and the first operation rate of the first resource configuration baseline. In this case, the BSOL 400 may select candidate resource configurations exceeding both the second resource configuration baseline and the first operation rate from the predetermined resource configurations as listed in Table 1, and determine one of the candidate resource configurations as the prediction-based resource configuration recommendation based on consumption metrics associated with the candidate resource configurations.

Optionally, the BSOL 400 may output prediction-based recommended resource configurations for individual block storage volumes to the data accumulator 532. At the accumulator enabler 533, the BSOL 400 may monitor if all of the block storage volumes have been analyzed at the prediction logic tier 530.

Upon determining the statistics-based resource configuration recommendation and the prediction-based resource configuration recommendation, the BSOL 400 may obtain a final recommended resource configuration from the statistics-based resource configuration recommendation and the prediction-based resource configuration recommendation (4718). In an implementation, a system operator may select one of the statistics-based resource configuration recommendation and the prediction-based resource configuration recommendation as the final recommended resource configuration over the next BSO interval 321. The BSOL 400 may receive the selection result input from the system operator. Then, the BSOL 400 may generate the BSO token to include instructions executable, for example, by the host interface 230 to provision the first block storage volume 111 with the final recommended resource configuration (4720).

Figure 9:
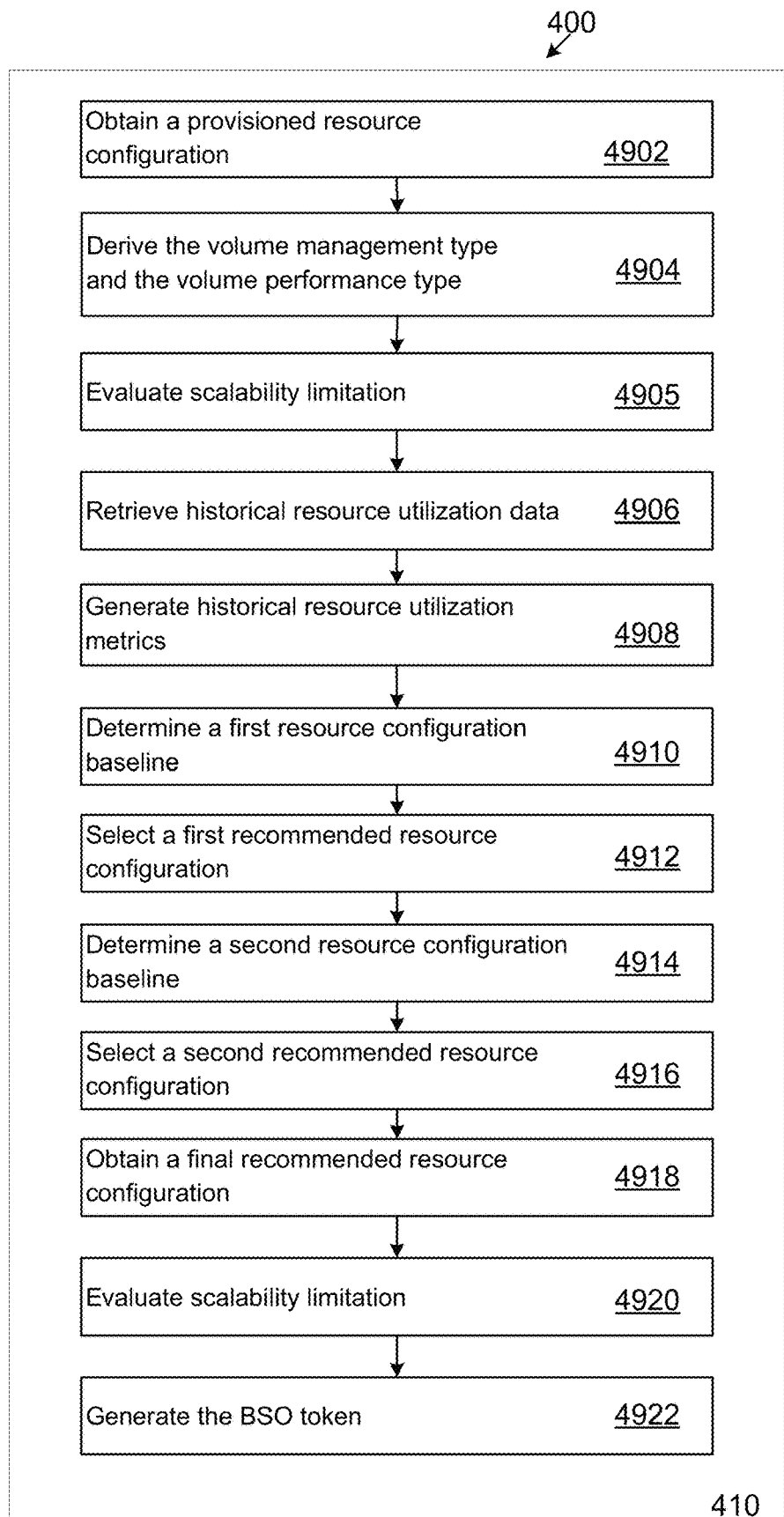
FIG. 9 shows example block storage volume optimization logic in accordance with an embodiment.

The tiers 520/530/540 may also collaboratively function to generate resource configuration recommendations for unmanaged block storage volumes, which will be described with reference to FIG. 9. In an implementation, similar to the managed block storage volume, two resource configuration recommendations may be generated for an unmanaged block storage volume, a statistics-based resource configuration recommendation and a prediction-based resource configuration recommendation. The statistics-based resource configuration recommendation may be generated at the statistical evaluation tier 540 while the prediction-based resource configuration recommendation may be generated at the prediction logic tier 530.

At the unmanaged volume selection layer 522, the BSOL 400 may select unmanaged premium block storage volumes. In an implementation, the BSOL 400 may obtain a provisioned resource configuration of the first block storage volume 111, for example, via the data staging layer 305 (4902). Then, the BSOL 400 may derive the volume management type and the volume performance type from the provisioned resource configuration (4904). If the first volume manage type is unmanaged type and the volume performance type is premium type, the first block storage volume 11 is selected.

At the constraint evaluation layer 523, the BSOL 400 may need to determine whether the first storage account 110 accommodating the first block storage volume 111 exceeds the scalability limitation placed on an unmanaged storage account (4905). The BSOL 400 may calculate a total storage capacity for the first storage account 110 by summing the storage capacities of the first block storage volume 111 and the block storage volume 112. If the total storage capacity is less than or equal to a predetermined storage capacity threshold, e.g., 500 TB, the BSOL 400 may proceed to subsequent operations. Alternatively or additionally, the BSOL 400 may calculate a total operation rate for the first storage account 110 by summing the maximum operation rates of the first block storage volume 111 and the block storage volume 112. If the total operation rate is less than or equal to a predetermined operation rate threshold, e.g., 20,000 IOPS, the BSOL 400 may proceed to subsequent operations.

Figure 7:
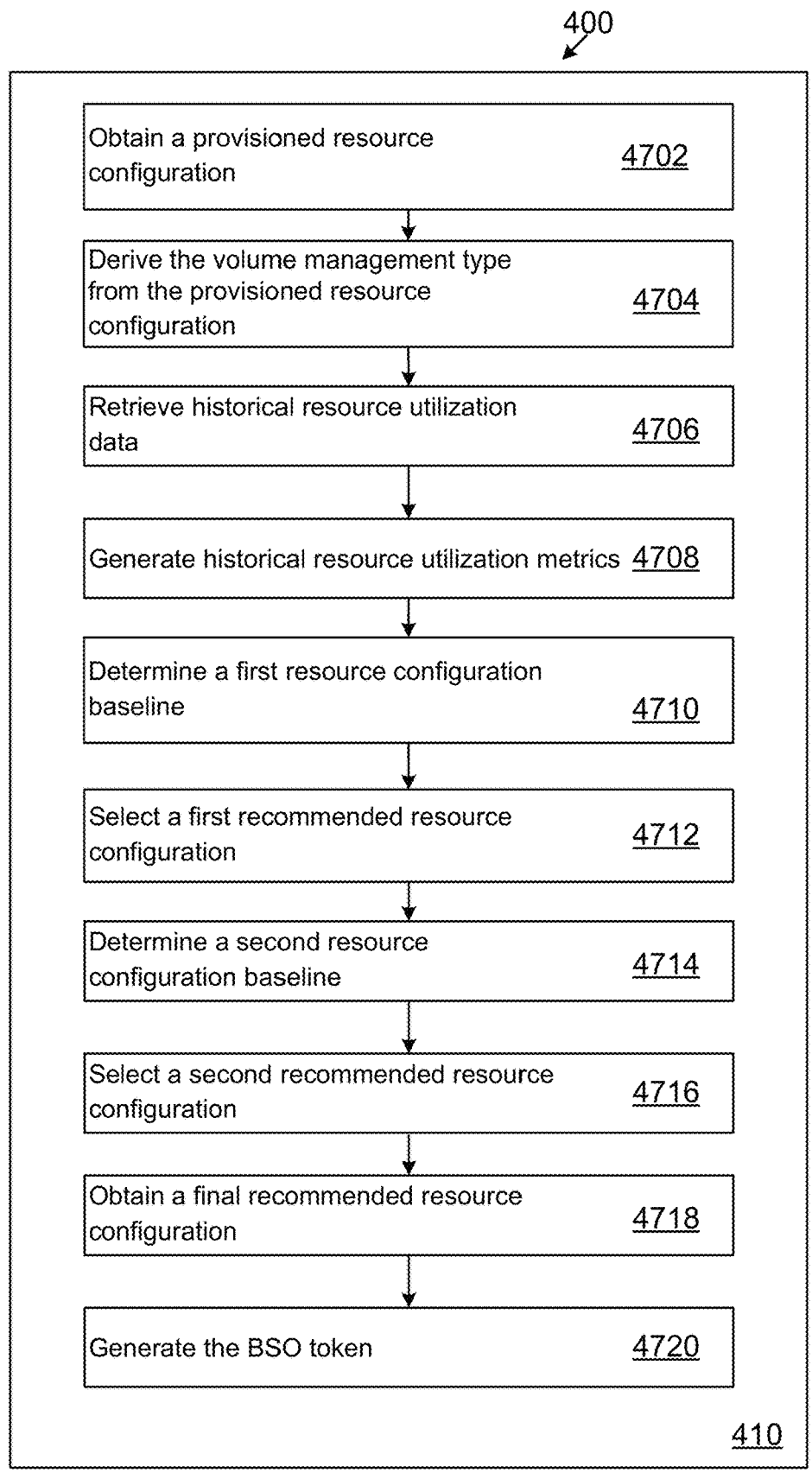
FIG. 7 shows example block storage volume optimization logic in accordance with an embodiment.

Similar to the operations as previously discussed with reference FIG. 7, at the metric computation layer 524, the BSOL 400 may retrieve historical resource utilization data for the first block storage volume 111 from the pre-processed historical resource utilization data 315 (4906). Then, the BSOL 400 may generate historical resource utilization metrics of the first block storage volume 111 from the historical resource utilization data for the first block storage volume 111 (4908). At the statistical evaluator 541, the BSOL 400 may determine a first resource configuration baseline based on the historical resource utilization metrics and provisioned resource configuration of the first block storage volume 111 (4910). Thereafter, the BSOL 400 may select a statistics-based resource configuration recommendation for the first block storage volume 111 from a plurality of resource configurations, for example the predetermined resource configurations in Table 1, based on the first resource configuration baseline (4912). At the predictive evaluator 531, the BSOL 400 may determine a second resource configuration baseline for the first block storage volume 111 based on the historical resource utilization data of the first block storage volume 111 obtained from the pre-processed historical resource utilization data 315 (4914). Then, the BSOL 400 may select a prediction-based resource configuration recommendation from the plurality of resource configurations based on the second resource configuration baseline (4916). Subsequently, the BSOL 400 may obtain a final recommended resource configuration from the statistics-based resource configuration recommendation and the prediction-based resource configuration recommendation (4918).

The BSOL 400 may need to determine if the first storage account 110 accommodating the first block storage volume 111 exceeds the scalability limitation provided that the first block storage volume 111 is provisioned with the final recommended resource configuration (4920). In an implementation, the BSOL 400 may calculate a summing storage capacity under the first storage account 110 based on the final recommended resource configuration for the first block storage volume 111. For example, the BSOL 400 may calculate a total storage capacity for the first storage account 110 by summing the storage capacity in the final recommended resource configuration for the first block storage volume 111 and the provisioned storage capacity of the block storage volume 112. If the total storage capacity is less than or equal to a predetermined storage capacity threshold, e.g., 500 TB, the BSOL 400 may generate the BSO token to include instructions executable, for example, by the host interface 230 to provision the first block storage volume 111 with the final recommended resource configuration (4922).

Alternatively or additionally, the BSOL 400 may calculate a total operation rate for the first storage account 110 by summing the operation rate in the final recommended resource configuration for the first block storage volume 111 and the provisioned operation rate of the block storage volume 112. If the total operation rate is less than or equal to a predetermined operation rate threshold, e.g., 20,000 IOPS, the BSOL 400 may generate the BSO token to include instructions executable, for example, by the host interface 230 to provision the first block storage volume 111 with the final recommended resource configuration.

Optionally, the BSOL 400 may generate a consumption optimization preview for the block storage volume based on the storage account merging recommendation and/or the resource configuration recommendation. The consumption optimization preview may indicate potential cost savings because of optimization recommendations for the block storage volume. For example, at the saving calculator 551 of the system 500, the BSOL 400 may calculate the potential cost savings as difference between the current consumption metric of the block storage volume and the optimized consumption metric of the block storage volume due to applying the optimization recommendations to the block storage volume.

Generally, the more the potential savings are, the higher priority that the block storage volume should be optimized. For example, for the block storage volumes undergoing the block storage volume optimization analysis, the BSOL 400 may sort their potential savings in descending order and calculate cumulative saving percentages incrementally for each of the block storage volumes in the descending order.

As an example, if the cumulative savings percentage for a block storage volume is less than or equal to 65%, the optimization priority for the block storage volume is set to be high. If the cumulative savings percentage for a block storage volume is less than or equal to 85% but greater than 65%, the optimization priority for the block storage volume is set to be medium. If the cumulative savings percentage for a block storage volume is greater than 85%, the optimization priority for the block storage volume is set to be low.

For purpose of illustration, the BSOL 400 may execute the example routines in Table 2 to implement functions of the prescriptive engine layer 350 in individual modules of the execution environment 400.

TABLE 1

Example Routine for prescribing block storage volume optimization

| | Description |
|---|---|
| Example Routine | # Storage merge optimization<br>Begin Loop:<br>  i = Storage Account N<br>  $\Sigma\ (\alpha_i) <= 20,000$<br>  i = Storage Account 1<br>  OR<br>  i= Storage Account N<br>  $\Sigma\ (\beta_i) <= 512,000$ and<br>  i = Storage Account 1<br>End Loop (when Merge Count = 0)<br>where,<br>$\alpha_i$ is a sum of maximum IOPS of block storage volumes under the storage account i<br>$\beta_i$ is a sum of storage capacities of block storage volumes under the storage account i.<br># Resource configuration optimization<br>$\epsilon$ = IF ($\lambda$(t) <= $\delta$, IF (($\zeta$(t) + ($\zeta$(t)* X)) < THEN ($\zeta$(t) + ( $\zeta$(t)* X)) ELSE $\sigma$),<br>ELSE<br>(IF (($\psi$(t) + ( $\psi$(t)* X)) <$\sigma$ THEN ($\psi$(t) + ( $\psi$(t)* X)) ELSE $\sigma$))<br>Where,<br>$\epsilon$ = Recommended IOPS<br>$\lambda$(t) = Max/$99^{th}$ Percentile IOPS consumption ratio<br>$\delta$ = IOPS consumption threshold<br>$\zeta$(t) = Max IOPS Consumption for the period "t"<br>X = Buffer term 10%<br>$\sigma$ = Provisioned IOPS<br>$\psi$(t) = $99^{th}$ Percentile for IOPS for the time "t"<br>$\Omega$ = IF ($\alpha$(t) <= $\pi$, IF ((y(t) + (y(t)*$\beta$)) <$\tau$ THEN (y(t) + (y(t)*$\beta$)) ELSE$\tau$),<br>ELSE(IF ($\epsilon$(t) + ($\epsilon$(t)*$\beta$)) <$\tau$ THEN (e (t) + (e(t)*($\beta$)) ELSE$\tau$))<br>Where,<br>$\Omega$ = Recommended throughput<br>$\alpha$(t) = Max/$99^{th}$ Percentile throughput consumption ratio<br>$\tau$ = THROUGHPUT consumption threshold<br>y(t) = Max THROUGHPUT Consumption for the period "t"<br>$\beta$ = Buffer term 10%<br>$\tau$ = Provisioned throughput<br>$\epsilon$(t) = $99^{th}$ Percentile for throughput for the time "t"<br>$\varepsilon$ = IF ($\Sigma/\theta$ >= 1.5 THEN ($\theta$ + $\theta$ *0.2) ELSE $\Sigma$)<br>Where,<br>$\varepsilon$ = Recommended storage capacity<br>$\Sigma$ = Provisioned storage capacity for the block storage volume<br>$\theta$ = Consumed storage capacity |

Optionally, the BSOL 400 may execute the similar operations at the prescriptive engine layer 350 to output respective block storage volume optimization recommendations for each of the block storage volumes undergoing the block storage volume optimization analysis. Upon the block storage volume optimization recommendations are output, the BSOL 400 then may, at the prescriptive engine layer 350, store the block storage volume optimization recommendations via a memory operation at the data staging layer 305.

Now referring to the presentation layer 360 in FIG. 3, where the BSOL 400 may access the optimization recommendations from the prescriptive engine layer 350, e.g., via data staging layer 305 memory operations to generate a BSO-control interface 366 including a BSO-window presentation 368. The BSO-window presentation 368 may include data and/or selectable options related to the optimization recommendations. In an implementation, the BSO-window presentation 368 may be configured to display prescriptive analysis information with regard to the block storage volume optimization.

The BSO-window presentation 368 may include data and/or selectable options related to the optimization recommendations including storage account merging recommendations and resource configuration recommendation. In an implementation, the BSO-window presentation 368 may be configured to display prescriptive analysis information with regard to the recommended storage account merges. For example, FIG. 10 illustrates an example of the storage account merging recommendations preview for unmanaged standard block storage volumes.

Figure 11:
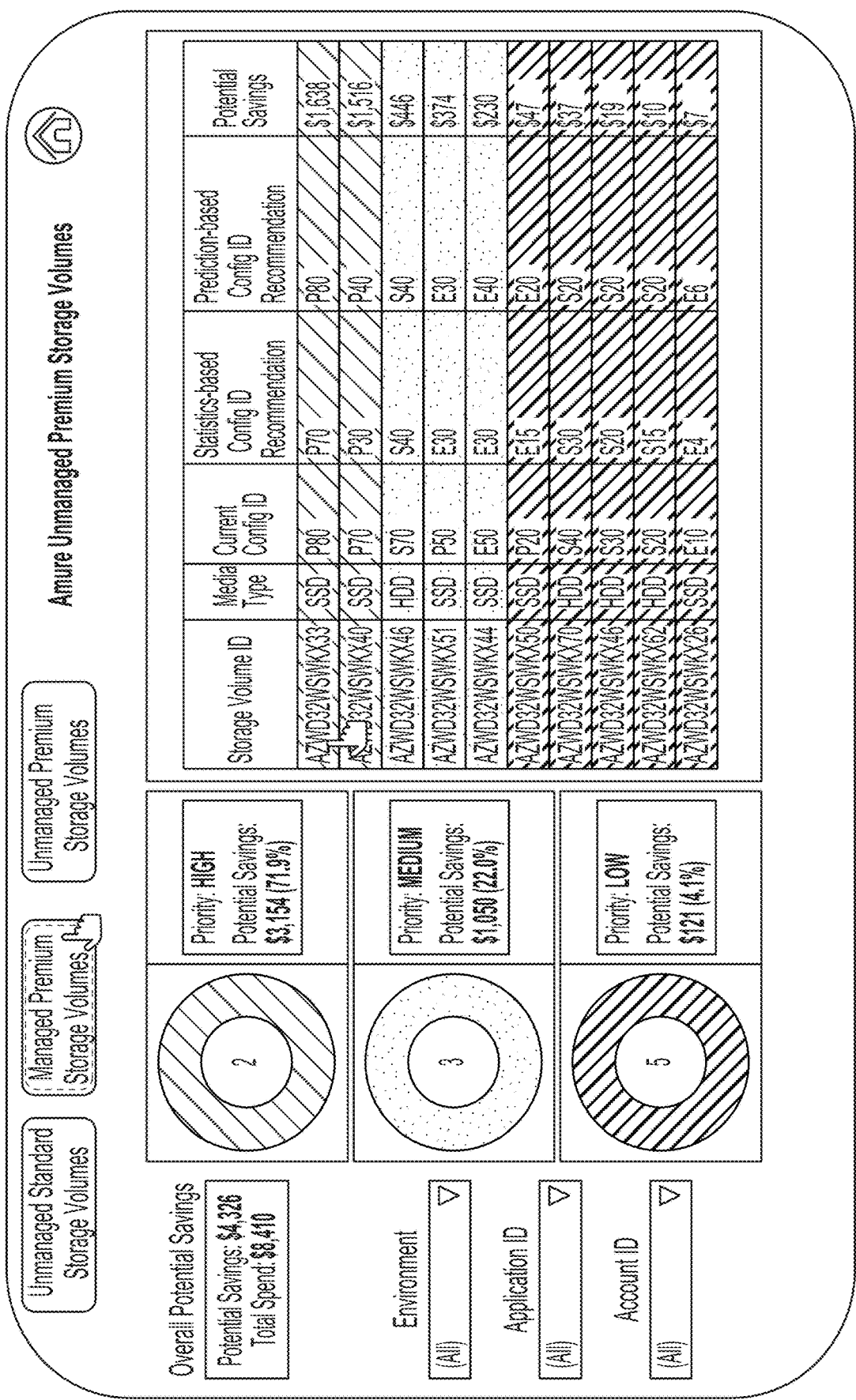
FIG. 11 shows an example block storage volume optimization control interface.

In another implementation, the BSO-window presentation 368 may be configured to display prescriptive analysis information with regard to the recommended resource configurations. For example, FIG. 11 illustrates an example of the resource configuration optimization analysis preview for managed block storage volumes including, for example, statistics-based resource configuration recommendation and prediction-based resource configuration recommendation as well as potential savings. FIG. 11 also illustrates an example of a resource configuration optimization priority for the managed block storage volumes in accordance with their potential savings. The statistics-based/prediction-based resource configuration recommendations may include recommended IOPS, throughput, and capacity storage. FIG. 12 illustrates an example of a detailed resource configuration optimization analysis for a specific block storage volume including, for example, the recommended IOPS and storage capacity configured in the statistics-based resource configuration recommendation and the recommended storage capacity configured in the prediction-base resource configuration.

Figure 13:
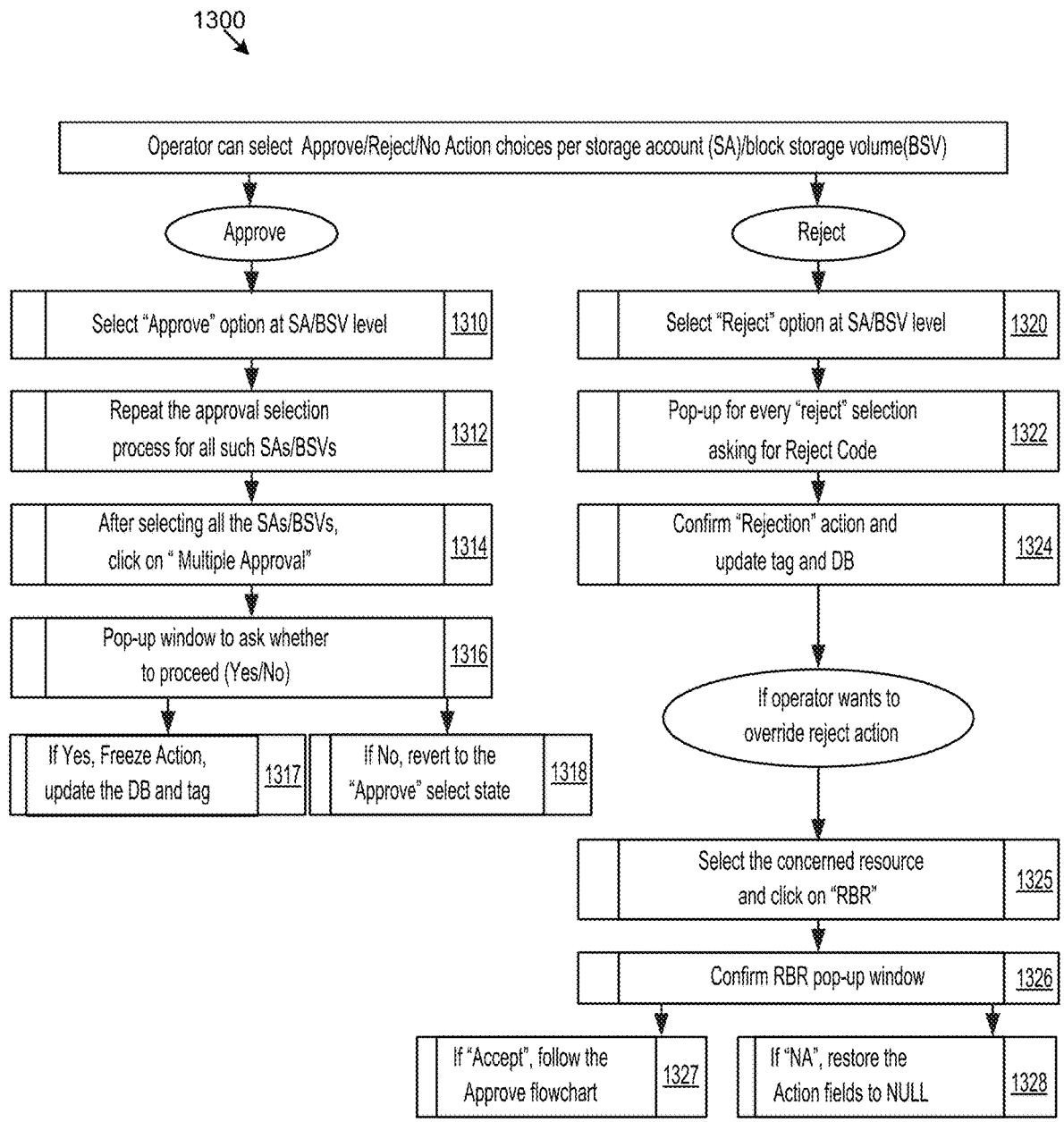
FIG. 13 shows an example interaction logic with a block storage volume optimization control interface in accordance with an embodiment.

Additionally or alternatively, the BSO-window presentation may include an option to approve/reject one or more (or all of) the block storage volume optimization recommendations. FIG. 13 shows an example interaction logic 1300 between input signals received from an operator and the BSO-window presentation 368 to approve/reject the displayed optimization recommendations. Specifically, the operator may take approval/rejection action per storage account and block storage volume in the BSO-window presentation 368.

For example, the BSO-window presentation 368 may include "Approve," "Reject," and "No action" options for each of the block storage volumes/storage accounts. The operator may select "Approve" option at block storage volume/storage account level (1310) and repeat the "Approve" selection for other block storage volumes/storage accounts (1312). After finishing the option selections for all the block storage volumes/storage accounts, the operator may click on "Multiple Approval" option (1314). As response, the BSO-window presentation 368 may pop-up a window to ask the operator to confirm to proceed with "Yes" and/or "No" options (1316). If the operator selects "Yes" option, the BSO-window presentation 368 may freeze action in the window and update the operator's inputs in the background storage storing the inputs (1317). If the operator selects "No" option, the BSO-window presentation 368 may revert to the "Approve" selection state (1318).

The operator may also select "Reject" option at block storage volume/storage account level (1320). For each "Reject" selection, the BSO-window presentation 368 may pop up a window to ask for a rejection code justifying the rejection (1322). Where the rejection code is verified, the BSO-window presentation 368 may confirm the rejection action and update the operator's inputs in the background storage (1324).

Optionally, if the operator would like to override his/her previous rejection action, the operator may select the concerned block storage volumes and click "RBR" (Roll Back Required) option (1325). As response, the BSO-window presentation 368 may pop up a window to confirm the "RBR" selection with "Accept" and "NA" (Not Accept) options (1326). If the operator selects "Accept" option, the BSO-window presentation 368 may enable to select the "Approve" option for the concerned block storage volumes/storage accounts (1327). If the operator selects "NA", the BSO-window presentation 368 may nullify all the selection actions with respect to the concerned block storage volumes/storage accounts (1328).

Through the interaction with the operator via the BSO-control interface, the BSOL 400 may determine whether to execute the recommended optimization for the block storage volume. Where the BSOL 400 determines to execute the recommended optimization, the BSOL 400 may generate a BSO token based on the recommended storage merge and/or final recommended resource configuration. The BSO token may, for example, include logic merging storage account and/or provisioning the block storage volume with the final recommended resource configuration.

After generation of the BSO token 352, the BSOL 400 may initiate deployment of the BSO token 352 by sending the BSO token 352 to the network interface circuitry (e.g., the network interface circuitry 210) and causing the network interface circuitry to send the BSO token 352 to a host interface (e.g., the host interface 230) for block storage volume optimization. For example, services such as Amazon Web Services (AWS), Cloudian, Microsoft Azure, or other cloud computing services, may maintain host interfaces (e.g., web interfaces, application programming interfaces, or other interfaces) by which cloud user/system operator may manage the block storage volumes.

In some cases, the BSOL 400 may initiate deployment via the data export layer 370. The data export layer 370 may format the reservation matrix in one or more formats for transfer. For example, the data export layer 370 may support format translation to java script object notation (JSON), extensible markup language (XML), comma separated value (CSV), Tableau Workbook (TBWX), hypertext markup language (HTML) or other formats. The data export layer 370 may also support transfer of the BSO token in one or more states, such as flat file transfers, streaming transfers, web service access, internet protocol transfers, or other transfers. Additionally or alternatively, the BSOL 400 may initiate deployment via the prescriptive engine layer 350 through direct transfer, direct network access, or other non-export transfer.

Figure 14:
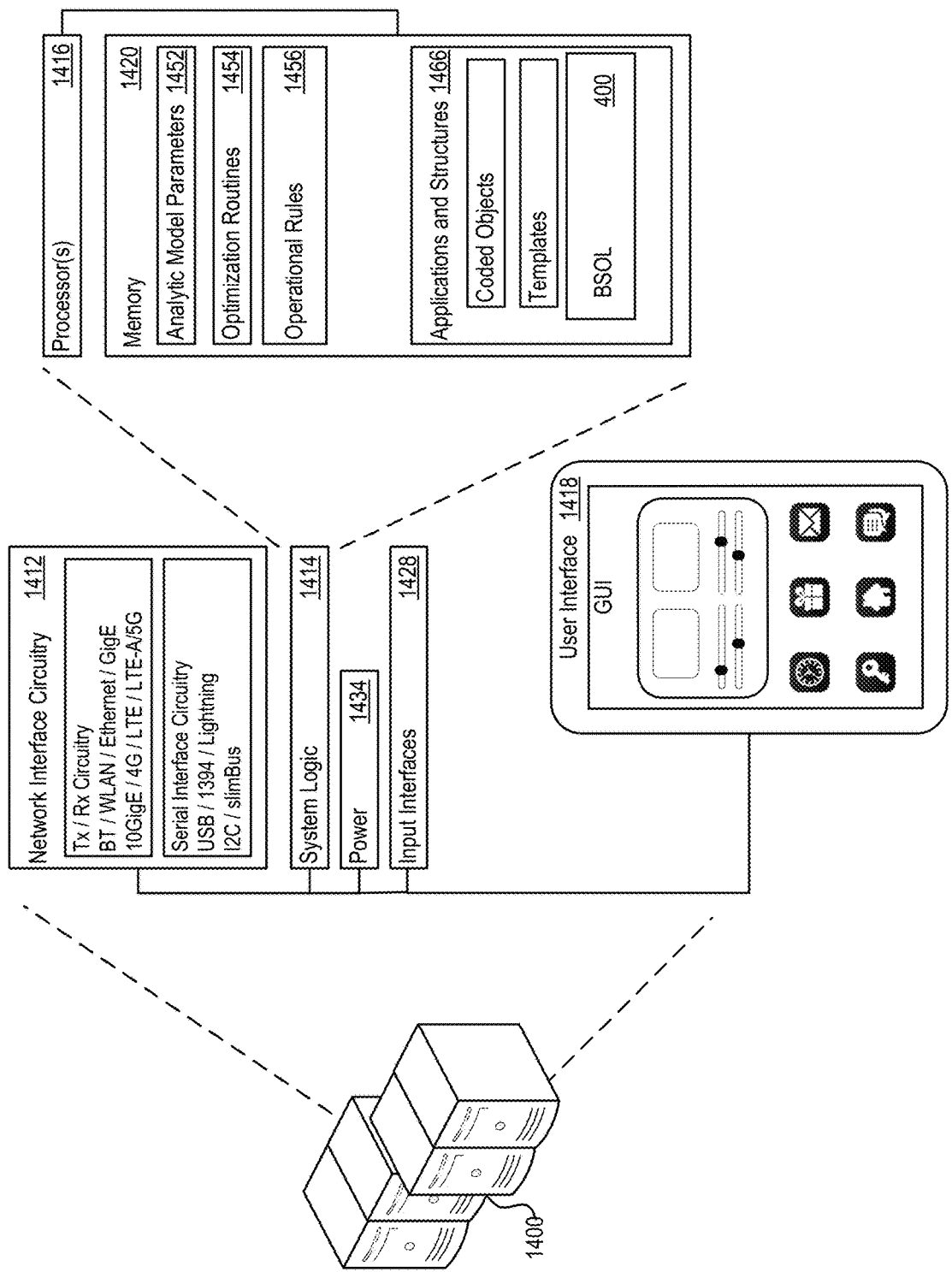
FIG. 14 shows an example system execution environment for the block storage volume optimization stack.

FIG. 14 shows an example system execution environment 1400 for the BSO stack 300 described above. The execution environment 1400 may include system logic 1414 to support execution of the multiple layers of BSO stack 300 described above. The system logic may include processors 1416, memory 1420, and/or other circuitry.

The memory 1420 may include analytic model parameters 1452, optimization routines 1454, and operational rules 1456. The memory 1420 may further include applications and structures 1466, for example, coded objects, machine instructions, templates, or other structures to support pre-processing the historical resource utilization data, generating historical resource utilization metrics, determining storage account merge, selecting recommended resource configuration, or other tasks described herein. The applications and structures 1466 may implement at least part of the BSOL 400.

The execution environment 1400 may also include network interface circuitry 1412, which may support wireless, e.g. Bluetooth, Wi-Fi, WLAN, cellular (4G, LTE/A, 5G), and/or wired, Ethernet, Gigabit Ethernet, optical networking protocols. The network interface circuitry 1412 may also include serial interfaces, such as universal serial bus (USB), serial ATA, IEEE 1394, lighting port, $I^2C$, slimBus, or other serial interfaces. The network interface circuitry 1412 may be used to support and/or implement remote operation of the BSO-control interface 366. The execution environment 1400 may include power functions 1434 and various input interfaces 1428. The execution environment may also include a user interface 1418 that may include human-to-machine interface devices and/or graphical user interfaces (GUI). The user interface 1418 may be used to support and/or implement local operation of the BSO-control interface 366. In various implementations, the system logic 1414 may be distributed over one or more physical servers, be implemented as one or more virtual machines, be implemented in container environments such as Cloud Foundry or Docker, and/or be implemented in serverless (functions as-a-Service) environments.

In some cases, the execution environment 1400 may be a specially defined computational system deployed in a cloud platform. In some cases, the parameters defining the execution environment may be specified in a manifest for cloud deployment. The manifest may be used by an operator to requisition cloud based hardware resources, and then deploy the software components, for example, the BSO stack 300, of the execution environment onto the hardware resources. In some cases, a manifest may be stored as a preference file such as a YAML (yet another mark-up language), JSON, or other preference file type. Additionally or alternatively, the manifest may include custom scripts to implement the BSO stack 300 in a serverless environment. Therein, a multiple-tier framework is described. The framework describes a series of the serverless tasks controlled via scripts. The serverless tasks overlap in execution to maintain continuity across the tasks. The computational task in divided into chunks that may be handled by individual serverless tasks. Accordingly, a complex analytic process, such as those describe in this disclosure, may be divided into chunks and executed over one or more overlapping serverless tasks.

The methods, devices, processing, circuitry, and logic described above may be implemented in many different ways and in many different combinations of hardware and software. For example, all or parts of the system, including the network interface circuitry and the optimization circuitry, may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible block storage volume medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a block storage volume medium and instructions stored in or on the medium, and the instructions when executed by the circuitry in a device may cause the device to implement any of the processing described above or illustrated in the drawings.

Implementations of the system may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A system comprising:
    network interface circuitry configured to:
        receive first account information of a first storage account associated with a first block storage volume and second account information of a second storage account associated with a second block storage volume; and
        send a block storage volume optimization (BSO) token to a host interface, the host interface configured to execute the BSO token to merge the first storage account with the second storage account;
    optimization circuitry in data communication with the network interface circuitry, the optimization circuitry configured to execute a BSO stack, the BSO stack executable at a prescriptive engine layer of the BSO stack to:
        obtain respective volume management types of the first block storage volume and the second block storage volume;
        obtain respective volume performance types of the first block storage volume and the second block storage volume;
        obtain respective storage regions and respective data redundancy types of the first storage account and the second storage account from the first account information and the second account information, respectively, the respective storage regions comprising physical location information of the respective first and second block storage volumes and, the respective data redundancy types comprising data replication policy information regarding the respective first and second storage accounts;
        in response to the respective volume management types being an unmanaged type and the respective volume performance types being a standard type, generate the BSO token to include instructions executable by the host interface to merge the first storage account with the second storage account according to the respective storage regions and the respective data redundancy types; and
        send the BSO token to the host interface via the network interface circuitry.

2. The system of claim 1, wherein the optimization circuitry is configured to:
    in response to the respective storage regions being a same storage region and the respective data redundancy types being a same redundancy type,
        generate the BSO token to merge the first storage account with the second storage account.

3. The system of claim 1, wherein the optimization circuitry is further configured to:
    in response to a sum of: an operation rate of the first block storage volume and an operation rate of the second block storage volume being less than or equal to a predetermined operation rate threshold and a sum of a storage capacity of the first block storage volume and a storage capacity of the second block storage volume being less than or equal to a predetermined storage capacity threshold,
        generate the BSO token to merge the first storage account with the second storage account.

4. The system of claim 1, wherein the unmanaged type is indicative of a block storage volume having limited scalability, and the standard type is indicative of a processing capacity of a block storage volume failing to reach a predetermined processing capacity threshold.

5. The system of claim 1, wherein the optimization circuitry is further configured to:
    in response to the first storage account being merged with the second storage account and a third storage account,
        obtain respective merging priorities of the second storage account and the third storage account based on a summing operation rate for the second storage account and a summing operation rate for the third storage account; and
        determine an order of merging with the second storage account and the third storage account based on the respective merging priorities.

6. The system of claim 5, wherein the second storage account has a higher merge priority than the third storage account in response to the summing operation rate for the second storage account being greater than the summing operation rate for the third storage account.

7. The system of claim 1, wherein the optimization circuitry is further configured to:
    in response to a volume management type of the first block storage volume being a managed type, the managed type indicative of a block storage volume without scalability limitation, or
    in response to the volume management type of the first block storage volume being an unmanaged type and the volume performance type of the first block storage volume being a premium type, the premium type indicative of a processing capacity of a block storage volume being able to reach a predetermined processing capacity threshold,
        obtain a provisioned resource configuration of the first block storage volume;
        obtain historical resource utilization data for the first block storage volume;
        generate historical resource utilization metrics from the historical resource utilization data for the first block storage volume;

determine a first resource configuration baseline based on the historical resource utilization metrics and the provisioned resource configuration; and select a statistics-based resource configuration recommendation from a plurality of resource configurations based on the first resource configuration baseline.

8. The system of claim 7, wherein the optimization circuitry is configured to:
select candidate resource configurations exceeding the first resource configuration baseline from the plurality of resource configurations; and
designate one of the candidate resource configurations as the statistics-based resource configuration recommendation based on consumption metrics associated with the candidate resource configurations.

9. The system of claim 8, wherein the optimization circuitry is configured to:
in response to a volume media type derived from the provisioned resource configuration being a first media, remove resource configurations associated with a second media from the candidate resource configurations, wherein the first media provides higher read and write speed than the second media.

10. The system of claim 7, wherein the first resource configuration baseline comprise a first throughput rate and the optimization circuitry is configured to:
obtain a maximum throughput rate and a percentile-based throughput rate over a predetermined operational time range from the historical resource utilization metrics;
calculate a throughput rate utilization ratio of the maximum throughput rate and the percentile-based throughput rate; and
determine the first throughput rate based on the throughput rate utilization ratio and a provisioned throughput rate derived from the provisioned resource configuration.

11. The system of claim 10, wherein the first resource configuration baseline comprises a first storage capacity and the optimization circuitry is configured to:
obtain consumed storage capacity from the historical resource utilization metrics;
calculate a storage capacity utilization ratio of a provisioned storage capacity derived from the provisioned resource configuration and the consumed storage capacity; and
determine the first storage capacity based on the storage capacity utilization ratio.

12. The system of claim 7, wherein the first resource configuration baseline comprise a first operation rate and the optimization circuitry is configured to:
obtain a maximum operation rate and a percentile-based operation rate over an operational time range from the historical resource utilization metrics;
calculate an operation rate utilization ratio of the maximum operation rate and the percentile-based operation rate; and
determine the first operation rate based on the operation rate utilization ratio and a provisioned operation rate derived from the provisioned resource configuration.

13. The system of claim 12, wherein the optimization circuitry is further configured to:
predict a second resource configuration baseline based on the historical resource utilization data; and
select a prediction-based resource configuration recommendation from the plurality of resource configurations based on the second resource configuration baseline.

14. The system of claim 13, wherein the second resource configuration baseline comprises a second storage capacity and the optimization circuitry is configured to:
predict the second storage capacity based on historical storage capacity utilization data obtained from the historical resource utilization data.

15. The system of claim 13, wherein the optimization circuitry is further configured to:
select the prediction-based resource configuration recommendation from the plurality of resource configurations based on the second resource configuration baseline and the first operation rate.

16. The system of claim 13, wherein the optimization circuitry is further configured to:
obtain a final recommended resource configuration from the statistics-based resource configuration recommendation and the prediction-based resource configuration recommendation; and
generate the BSO token to include instructions executable by the host interface to provision the first block storage volume with the final recommended resource configuration.

17. The system of claim 16, wherein the optimization circuitry is further configured to:
in response to the volume management type of the first block storage volume being the unmanaged type and the volume performance type of the first block storage volume being the premium type,
calculate a summing operation rate for the first storage account based on the final recommended resource configuration of the first block storage volume; and
in response to the summing operation rate being less than or equal to a predetermined operation rate threshold, generate the BSO token to include instructions executable by the host interface to provision the first block storage volume with the final recommended resource configuration.

18. The system of claim 16, wherein the optimization circuitry is further configured to:
in response to the volume management type of the first block storage volume being the unmanaged type and the volume performance type of the first block storage volume being the premium type,
calculate a summing storage capacity under the first storage account based on the final recommended resource configuration for the first block storage volume; and
in response to the summing storage capacity being less than or equal to a predetermined storage capacity threshold, generate the BSO token to provision the first block storage volume with the final recommended resource configuration.

19. A method comprising:
receiving, at network interface circuitry, a first account information of a first storage account associated with a first block storage volume and a second account information of a second storage account associated with a second block storage volume;
executing a block storage volume optimization (BSO) stack at optimization circuitry, the optimization circuitry in data communication with the network interface circuitry, wherein executing the BSO stack comprises, at a prescriptive engine layer of the BSO stack:
obtaining respective volume management types of the first block storage volume and the second block storage volume;

obtaining respective volume performance types of the first block storage volume and the second block storage volume;

obtaining respective storage regions and respective data redundancy types of the first storage account and the second storage account from the first account information and the second account information, respectively, the respective storage regions comprising a geographic location information of the respective first and second block storage volumes and, the respective data redundancy types comprising data replication policy information regarding the respective first and second storage accounts;

in response to the respective volume management types being an unmanaged type and the respective volume performance types being a standard type, generating a BSO token to include instructions executable by a host interface to merge the first storage account with the second storage account according to the respective storage regions and the respective data redundancy types; and sending the BSO token, via the network interface circuitry, to a host interface.

20. A product including:

non-transitory machine-readable media; and instructions stored on the machine-readable media, the instructions configured to, when executed, cause a machine to:

receive, at network interface circuitry, a first account information of a first storage account associated with a first block storage volume and a second account information of a second storage account associated with a second block storage volume;

execute, at optimization circuitry in data communication with the network interface circuitry, a block storage volume optimization (BSO) stack, the BSO stack executable to, at a prescriptive engine layer of the BSO stack:

obtain respective volume management types of the first block storage volume and the second block storage volume;

obtain respective volume performance types of the first block storage volume and the second block storage volume;

obtain respective storage regions and respective data redundancy types of the first storage account and the second storage account from the first account information and the second account information, respectively, the respective storage regions comprising a geographic location information of the respective first and second block storage volumes and, the respective data redundancy types comprising data replication policy information regarding the respective first and second storage accounts;

in response to the respective volume management types being an unmanaged type and the respective volume performance types being a standard type, generate a BSO token to include instructions executable by a host interface to merge the first storage account with the second storage account according to the respective storage regions and the respective data redundancy types; and send the BSO token, via the network interface circuitry, to the host interface.

* * * * *

UNITED STATES PATENT AND TRADEMARK OFFICE
CERTIFICATE OF CORRECTION

PATENT NO. : 11,216,202 B1  
APPLICATION NO. : 16/988628  
DATED : January 4, 2022  
INVENTOR(S) : Madhan Kumar Srinivasan et al.

Page 1 of 1

It is certified that error appears in the above-identified patent and that said Letters Patent is hereby corrected as shown below:

In the Specification

Column 5, Line 5, delete "lops" and insert in its place --IOPS--.

Column 17, Line 1, delete "Table 1" and insert in its place --Table 2--.

Column 17, Table 2, Line 19, insert --δ-- between "<" and "THEN".

Column 17, Table 2, Line 26, delete "Consumptionor" and insert in its place --Consumption for--.

Column 17, Table 2, Line 34, delete "τ" and insert in its place --π--.

Signed and Sealed this  
Twelfth Day of July, 2022

Katherine Kelly Vidal  
*Director of the United States Patent and Trademark Office*